(12) United States Patent  
Donner et al.

(10) Patent No.: US 12,415,652 B2  
(45) Date of Patent: Sep. 16, 2025

(54) REUSABLE PLASTIC CARRIER BAG

(71) Applicant: Mettler Packaging LLC, Raynham, MA (US)

(72) Inventors: Georg Donner, Morbach (DE); Wolfgang Trossen, Morbach (DE)

(73) Assignee: Mettler Packaging LLC, Raynham, MA (US)

( * ) Notice: Subject to any disclaimer, the term of this patent is extended or adjusted under 35 U.S.C. 154(b) by 168 days.

(21) Appl. No.: 18/504,008

(22) Filed: Nov. 7, 2023

(65) Prior Publication Data

US 2024/0067409 A1 Feb. 29, 2024

Related U.S. Application Data

(62) Division of application No. 15/717,826, filed on Sep. 27, 2017, now Pat. No. 11,820,555.

(30) Foreign Application Priority Data

Aug. 28, 2017 (DE) ...................... 20 2017 105 180.3

(51) Int. Cl.  
*B65D 33/10* (2006.01)  
*B65D 30/08* (2006.01)  
*B65D 33/00* (2006.01)  
*B65D 33/02* (2006.01)

(52) U.S. Cl.  
CPC ........... *B65D 33/105* (2013.01); *B65D 31/04* (2013.01); *B65D 33/004* (2013.01); *B65D 33/02* (2013.01)

(58) Field of Classification Search  
CPC .... B65D 33/105; B65D 33/004; B65D 33/02; B65D 31/04  
USPC ....................................................... 383/17, 20  
See application file for complete search history.

(56) References Cited

U.S. PATENT DOCUMENTS

| 2,980,312 | A | 4/1961 | Gould |
| 3,105,628 | A | 10/1963 | Mack |
| 3,339,822 | A | 9/1967 | Charles |
| 3,506,048 | A | 4/1970 | Jortikka |
| 3,565,327 | A | 2/1971 | Rodley |
| 3,568,918 | A | 3/1971 | Blomqvist |
| 3,753,824 | A | 8/1973 | Bosse |
| 3,850,724 | A | 11/1974 | Lehmacher |

(Continued)

FOREIGN PATENT DOCUMENTS

| CA | 2035644 A1 | 8/1991 |
| DE | 1 457 232 A1 | 11/1968 |

(Continued)

OTHER PUBLICATIONS

Communication under Article 94(3) EPC, dated Dec. 22, 2022, for European Patent Application 20211839.4. (11 pages) (with English Machine Translation).

(Continued)

*Primary Examiner* — Jes F Pascua  
(74) *Attorney, Agent, or Firm* — Seed Intellectual Property Law Group LLP

(57) ABSTRACT

The present disclosure provides a plastic carrier bag wherein the front and rear panel is designed to be multi-layered comprising an inner layer and an outer layer, and a reinforcing area containing at least one single or multi-layered plastic film strip is secured on the inside or outside to the front and rear panel, respectively.

37 Claims, 11 Drawing Sheets

(56) References Cited

U.S. PATENT DOCUMENTS

| | | |
|---|---|---|
| 3,908,571 A | 9/1975 | Motsenbocker |
| 5,141,336 A | 8/1992 | Sander |
| 5,511,445 A | 4/1996 | Hildebrandt |
| 6,899,663 B2 | 5/2005 | Tetenborg |
| 7,866,885 B2 | 1/2011 | Kujat et al. |
| 8,267,580 B2 | 9/2012 | Schneider |
| 8,821,018 B2 | 9/2014 | Tan |
| 10,625,905 B2 | 4/2020 | Donner et al. |
| 11,820,555 B2 | 11/2023 | Donner et al. |
| 2003/0131447 A1 | 7/2003 | Mikus |
| 2006/0013513 A1 | 1/2006 | Meyer |
| 2011/0033133 A1 | 2/2011 | Kujat |
| 2012/0027321 A1 | 2/2012 | Tan |

FOREIGN PATENT DOCUMENTS

| | | | |
|---|---|---|---|
| DE | 2116859 A1 | 10/1972 | |
| DE | 2215675 A1 | 10/1973 | |
| DE | 28 53 061 A1 | 6/1980 | |
| DE | 3144702 A1 * | 5/1983 | |
| DE | 87 05 849 U1 | 6/1987 | |
| DE | 40 12 897 A1 | 8/1991 | |
| DE | 690 09 906 T2 | 1/1995 | |
| DE | 296 12 070 U1 | 9/1996 | |
| DE | 199 24 626 A1 | 12/2000 | |
| DE | 101 16 920 A1 | 10/2002 | |
| DE | 202005010674 U1 * | 2/2006 | A45C 13/1023 |
| EP | 0 457 019 A1 | 11/1991 | |
| EP | 0758613 A1 * | 2/1997 | B65D 33/105 |
| EP | 1 083 132 A2 | 3/2001 | |
| EP | 2 353 431 A1 | 8/2011 | |
| EP | 3 770 078 A1 | 1/2021 | |
| EP | 3 812 294 A1 | 4/2021 | |
| FR | 2014787 A1 * | 4/1970 | |
| FR | 2 164 047 A5 | 7/1973 | |
| FR | 2848190 A1 * | 6/2004 | B65D 31/04 |
| FR | 2894940 A1 * | 6/2007 | B65D 33/105 |
| FR | 3050182 A1 | 10/2017 | |
| GB | 842681 A * | 7/1960 | B65D 33/105 |
| GB | 1000079 A | 8/1965 | |
| GB | 1229131 | 4/1971 | |
| GB | 2 097 361 A | 11/1982 | |
| JP | 201743379 A | 3/2017 | |
| KR | 200398351 Y1 | 10/2005 | |
| KR | 10-2017-0005995 A | 1/2017 | |
| NL | 7000483 A | 4/1970 | |
| WO | 01/51372 A1 | 7/2001 | |
| WO | 02/066338 A1 | 8/2002 | |
| WO | WO-03064146 A1 * | 8/2003 | B31B 70/876 |
| WO | 2007/071150 A1 | 6/2007 | |
| WO | 2017033418 A1 | 3/2017 | |

OTHER PUBLICATIONS

European Search Report, dated Feb. 3, 2021, for European Patent Application No. 20211839.4. (15 pages).
Extended European Search Report, dated Apr. 4, 2019, for European Patent Application No. 18189980.8. (31 pages) (with English Machine Translation).
Partial European Search report for EP3450343, dated Nov. 28, 2018, 6 pages.
Extended European Search Report for EP3450343, dated Mar. 21, 2019, 13 pages.
First Office Action for EP3450343, dated Apr. 30, 2020, 6 pages.
Second Office Action for EP3450343, dated Oct. 26, 2020, 4 pages.
Result of the Opposition Proceedings for EP3450343 amended set of allowable claims (+English Translation of allowed claims), dated Oct. 12, 2023, 11 pages.
Examination Report No. 1 for AU 2018222908, dated Sep. 15, 2023, 3 pages.
Interlocutory Decision in the Opposition Proceedings for EP3450343, dated Nov. 21, 2023, 91 pages.
Extended European Search Report for EP 18 18 9980, dated Mar. 21, 2019, 5 pages.
Grounds of Opposition, EP 3450343, dated Oct. 6, 2021, 42 pages.
Reply to Grounds of Opposition, EP 3450343, dated Mar. 2, 2022, 41 pages.
Preliminary Opinion of the Opposition Department, EP 3450343, dated Oct. 4, 2022, 7 pages.
Grounds of Opposition, EP 3770078, dated Oct. 10, 2022, 14 pages.

* cited by examiner

REUSABLE PLASTIC CARRIER BAG

BACKGROUND

Technical Field

The present disclosure provides a reusable plastic carrier bag.

Description of the Related Art

Carrier bags, as commonly placed by shops at the disposal of customers to transport items, are generally made of plastic or paper. While these sorts of carriers have been provided in the past for single use, there is now an increasing demand for suitable carriers which can be reused. Reusable plastic carrier bags usually have larger dimensions and have separate holding straps attached to the front and rear panel. Conventional bags with straps can be found for example in DE 101 16 920 A1, WO 01/51372 A1, and DE 40 12 897 A1.

Particularly in the case of reusable plastic carrier bags with larger dimensions, sufficient load-bearing capacity and carrying capacity can sometimes be problematic due to mechanical wear. The tearing off or breaking of a holding strap or the area in which the holding strap is attached is not acceptable. For this reason the commercial buyers of carrier bags with straps, for example department stores and large chains, demand very high levels of quality for such bags. The disadvantage of known larger dimensioned holding strap carrier bags is that they are quite complicated to manufacture.

There is accordingly a need to provide carrier bags made of plastic, in some cases reusable plastic carrier bags, which do not have the disadvantages of the carrier bags of the prior art and which in some cases are suitable for the repeated reliable transport of heavy loads and which can also be mass-produced in a simple and inexpensive manner.

BRIEF SUMMARY

Accordingly, the present disclosure provides a plastic carrier bag with a closed or substantially closed bottom end and an opposite opening end, comprising a front panel and a rear panel, with a first side edge and an opposite second side edge respectively and an opening edge, a bottom edge and at least one holding strap joined to the front panel and/or at least one holding strap joined to the rear panel with a first and a second joining area, respectively. The front panel and the rear panel are joined in the region of their first and second side edges and their bottom edges at least in sections directly or by side edges and/or side folds and/or a bottom fold. The front and/or rear panel is designed to be multi-layered, in some cases double-layered, comprising at least one internal layer, in some cases an inner layer, and an outer layer. The front and/or rear panel in the region of the opening end comprises a reinforcing area which in some cases extends to the opening end or comprising the latter, containing at least one single or multi-layered, in some cases double-layered, plastic film strip secured on the inside and/or outside to the front panel and/or at least one single or multi-layered, in some cases double-layered, plastic film strip secured on the inside and/or outside to the rear panel and extending from or spaced apart from the first side edge in the direction of or up to the second side edge.

By way of the previously described embodiment of a plastic carrier bag according to the present disclosure, reinforcement is provided in the upper edge area which withstands mechanically heavy loads and provides a very effective bottom for the connection of holding straps. The plastic carrier bag provided with such a reinforcing area can also be opened comfortably and without difficulty.

In an advantageous embodiment of the aforementioned plastic carrier bag, it is possible that the holding strap joined to the front panel in its first and second connecting areas and/or the holding strap joined to the rear panel in its first and second joining area has in the region of the respective first to second joining area at least partly a first flexible, in some cases hose-like, hollow body and/or a single or multi-layered, in most cases flexible, material strip not forming a hollow body, in some cases a flexible plastic material strip, which is surrounded at least in sections, in some cases substantially fully, by a second flexible, in some cases hose-like, hollow body.

By way of the previously described embodiment of a plastic carrier bag according to the present disclosure, an improved mechanical load-bearing capacity, in some cases of reusable plastic carrier bags, is ensured in addition to providing an excellent level of carrying comfort. Both the holding strap itself and its connection to the body of the plastic carrier bag are characterized by having a high degree of tearing resistance.

In an advantageous embodiment of the plastic carrier bag specified above, it is possible that the front and/or rear panel is designed to be multi-layered, in some cases double-layered, comprising at least one internal layer, in some cases an inner layer, and an outer layer, and that the front and/or rear panel in the area of the opening end has a reinforcing area extending in some cases up to the opening end or comprising the latter, containing at least one single or multi-layered, in some cases double-layered, plastic film strip secured on the inside and/or outside to the front panel and/or at least one single or multi-layered, in some cases double-layered, plastic film strip secured on the inside and/or outside to the rear panel and extending from or spaced apart from the first side edge in the direction of or up to the second side edge.

By combining the above described features which form the reinforcing area with those above described features of the holding strap, a particularly robust and loading-bearing plastic carrier bag is obtained.

BRIEF DESCRIPTION OF THE SEVERAL VIEWS OF THE DRAWINGS

Further features and advantages of the present disclosure are presented in the description below, in which rather suitable embodiments of the present disclosure are explained as examples with reference to schematic drawings without restricting the present disclosure as a result, wherein.

Figure 1A:
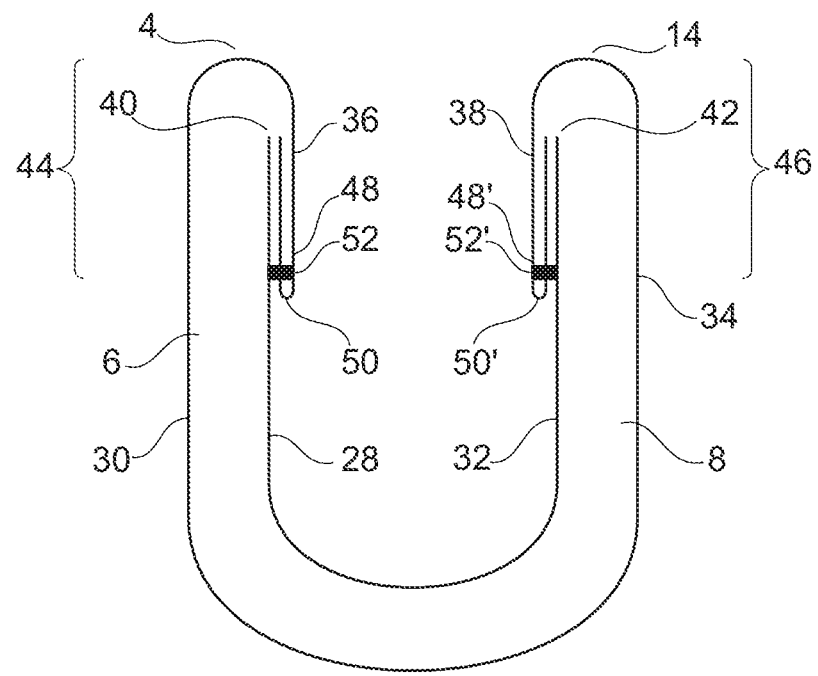
FIG. 1a shows a schematic cross-sectional view of a section of a first embodiment of a plastic carrier bag according to the present disclosure.

In the figures, the items depicted therein are not drawn to scale.

DETAILED DESCRIPTION

A plastic carrier bag according to the present disclosure is also advantageous in which the holding strap joined to the front panel and/or the rear panel in its first and second connecting areas is heat sealed to the single or multi-layered plastic film strip of the reinforcing area, and such as also to the at least one internal layer, in some cases the inner layer, and/or the outer layer, in some cases thermoplastically sealed and/or adhered. In this case, thermoplastic sealing has generally proved to be particularly suitable for achieving a tearing-resistance join on the body of the plastic carrier bag, in some advantageous cases in the reinforcing area. The results are particularly good when the, in some cases heat-sealed or thermoplastically-sealed, first and second connecting areas of the holding straps do not overlap in the reinforcing area with other sealing or adhesion areas.

In terms of the present disclosure, the reinforcing area is the section in the area of the opening end in which the single or multi-layered, in some cases double-layered, plastic film strip is provided. In said section, there is generally an overlap of sections of the inner and outer layer of the front or rear panel with the plastic film strip. There are also generally connections between said individual layers or films in this overlapping section.

For many applications of the plastic carrier bags according to the present disclosure, it has proved to be advantageous that the first and second connecting areas of the holding strap joined to the front panel and/or the first and second connecting areas of the holding strap joined to the rear panel are on the inner side of the front or rear panel in the region of the single or multi-layered plastic film strip of the reinforcing area. This type of attachment is therefore also an advantage in some cases as the reinforcing area of the plastic carrier bag according to the present disclosure is advantageously generally on the inside so that there is a direct connection of the holding in its joining areas to said reinforcing area. It is thus also possible to prevent the upper edges of the carrier bag forming protruding edges when inserting items and from being pushed inwards from contact with the items, thereby reducing access to the bag or making it more difficult. The holdings straps attached to the inside make it possible to bend the upper edges of the carrier bag outwards and thus prevent contact with the items. A relatively large opening area is ensured in this way.

In another embodiment of the plastic carrier bag according to the present disclosure, it is possible that the holding strap joined to the front panel and/or the holding strap joined to the rear panel, in some cases on the inside, is heat sealed respectively in its first and second attachment areas, directly or indirectly, to the single or multi-layered plastic film strip of the reinforcing area, and the at least one internal layer at least one internal layer, in some cases the inner layer, and the outer layer, in some cases is thermoplastically sealed and/or adhered. In said first and second joining areas at least the inner side of the second hollow body of the holding strap, in some cases the inward facing side of the second flexible plastic material strip, is heat sealed to the outside of the first hollow body or the facing side of the single or multi-layered material strip not forming a hollow body, in some cases the outwardly facing side of the first flexible plastic material strip, in some cases is thermoplastically sealed and/or adhered.

If the first and second joining areas of the holding strap bear directly on the plastic film strip of the reinforcing area, the connection to the at least one internal layer, in some cases the inner layer, and the outer layer is generally indirect, i.e., via the respective adjacent layer. When the first and second joining areas of the holding strap lie directly on the outer or inner layer, the connection to the at least one internal layer, in some cases the inner layer, or the outer layer and the layer(s) of the plastic film strip of the reinforcing area is correspondingly generally indirect, i.e., via the adjacent layer. In some embodiments, for example during the heat sealing, in some cases thermoplastic sealing, blending may occur between the melted material of the layers concerned so that a clear assignment of material to layers is no longer possible.

In a further development of the plastic carrier bag according to the present disclosure, the latter can have a first and a second holding strap connected to the front panel respectively in first and second connecting areas, wherein the first holding strap between the associated first and second connecting areas has a greater extension than the second strap.

Alternatively and optionally in addition, said plastic carrier bag can have a first and a second holding strap joined to the rear panel respectively in first and second connecting areas, wherein the first holding strap has a greater extension between the associated first and second connecting areas than the second holding strap. One holding strap or one pair of holding straps can be provided in this way for carrying by hand and an additional holding strap or pair of holding straps can be provided for carrying the plastic carrier bag over the shoulder. The first and second connecting areas of the first and second holding straps of the front panel and/or rear panel can thus be arranged congruently above one another or can be made in one process or can be separate from one another. In the latter embodiment, it has proved to be advantageous if the first and second connecting areas of the shorter strap, that is, the strap with the smaller extension between said connecting areas, between the first and second connecting areas of the longer strap are on the front or rear panel.

With regard to the holding straps of the plastic carrier bags according to the present disclosure, holding straps are advantageous in which the first flexible, in some cases hose-like, hollow body is made from a first flexible plastic material strip with opposite first and second longitudinal side edges, the opposite first and second longitudinal side edges of which are heat sealed to one another in an overlapping area, in some cases thermoplastically sealed and/or adhered and/or, optionally in which the second flexible, in some cases hose-like, hollow body is made from a second flexible plastic material strip with opposite first and second longitudinal side edges, the opposite first and second longitudinal side edges of which are heat sealed to one another in a second overlapping area, in some cases thermoplastically sealed and/or adhered.

In an advantageous configuration, the first and second flexible plastic material strip, for example in the form of polyolefin film strips, in some cases polyethylene film strips, can have a rectangular form when spread out. The longitudinal edges of this material strip by forming the first or second in some cases hose-like hollow body can then be moved towards one another and joined together in the overlapping area. In this case, the first longitudinal side edge can be positioned both above and below the second longitudinal side edge in an overlapping area.

A particularly high degree of strength is achieved in some cases in that the first plastic material strip of the first flexible, in some cases hose-like, hollow body and the second plastic material strip of the second flexible, in some cases hose-like, hollow body are heat sealed to one another at least in sections, in some cases along the first and second overlapping areas, in some cases are thermoplastically sealed and/or adhered.

It has been frequently proved to be advantageous to perform the heat sealing of the first and second plastic material strip in the first and or second overlapping area in a single method step, i.e., substantially at the same time. A uniform sealing seam is formed along the particularly hose-like strap in this way. This embodiment has an additional advantage that the first and second flexible hollow body are joined together in the area of said uniform sealing seam, in some cases thermoplastically sealed, resulting in even greater mechanical strength. Alternatively, the first and the second in some cases hose-like hollow body can also be joined together in sections or continually along their whole length, in some cases along a connecting strip, without the first and second overlapping areas overlapping in this joining area.

In an alternative configuration, it is possible with respect to the joining of the first and second flexible hollow bodies that the first flexible, in some cases hose-like, hollow body is formed by a first flexible plastic material strip with opposite first and second longitudinal side edges and that the second flexible, in some cases hose-like, hollow body is formed by a second flexible plastic material strip with opposite first and second longitudinal side edges. In the overlapping area of the first and second longitudinal side edge of the first flexible plastic material strip, the first longitudinal side edge of the first plastic material strip is heat sealed to the first longitudinal side edge of the second material strip and said first longitudinal side edge of the second plastic material strip is heat sealed to the second longitudinal side edge of the first plastic material strip, in some cases thermoplastically sealed and/or adhered. In the overlapping area of the first and second longitudinal side edge of the second flexible plastic material strip, the second longitudinal side edge of the first plastic material strip is heat sealed to the second longitudinal side edge of the second material strip and said second longitudinal side edge of the first plastic material strip is heat sealed to the first longitudinal side edge of the second plastic material strip, in some cases thermoplastically sealed and/or adhered.

For many applications it has proved to be advantageous to use plastic carrier bags in which the first holding strap containing the first and second flexible, in some cases hose-like, hollow body and/or the second holding strap containing the first and second flexible, in some cases hose-like, hollow body are pressed flat forming two opposite longitudinal folding edges, wherein optionally the overlapping areas of the opposite first and second longitudinal side edges of the first and second flexible plastic material strip of the first and second flexible hollow body of the first and/or second strap are between opposite longitudinal folding edges and in some cases on the same side. Alternatively, it can also be provided that the first holding strap containing the single or multi-layered material strip not forming a hollow body and the second flexible, in some cases hose-like, hollow body and/or the second strap containing the single or multi-layered material strip not forming a hollow body and the second flexible, in some cases hose-like, hollow body are pressed flat forming two opposite longitudinal folding edges, wherein optionally the overlapping area of the opposite first and second longitudinal side edges of the second flexible plastic material strip of the second flexible hollow bodies of the first and/or second holding strap are between the opposite longitudinal folding edges. By way of the aforementioned configurations, the preliminary stage of the holding strap can be stored wound in a flat-pressed state on a roller and cut off the latter as necessary. The flat pressed holding strap also provides a comfortable feeling when carrying the bag and enables an even distribution of the carrying forces.

According to a further advantageous configuration, in some cases also of the preceding embodiment, in the first and/or second joining area of, in some cases a flat pressed, first and/or second holding strap, the side of the holding strap pressed flat is the joining side which does not have the overlapping areas of the opposite first and second longitudinal side edges of the first and second flexible plastic material strip of the first and second flexible hollow bodies. It has surprisingly been found that it is possible to achieve a particularly good level of mechanical stability and tearing resistance in this way. By way of the holding straps for the plastic carrier bags according to the present disclosure, embodiments can also be realized for the first time in which the second flexible, in some cases hose-like, hollow body of the holding strap of the front and/or rear panel, in some cases second flexible plastic material strip forming or containing the second flexible, in some cases hose-like, hollow body of the holding strap of the front and/or rear panel, is based on an at least partly transparent plastic material, in some cases polyethylene, which can be printed or is printed at least partly on the inside, in some cases by way of reverse printing. In that in the described embodiment the printing is on the inside of the second hollow body of the holding strap, this is not affected while being carried, for example by abrasion. This is also achieved in the embodiment according to the present disclosure in which the first flexible, in some cases hose-like, hollow body or the single or multi-layered material strip not forming a hollow body, in some cases plastic material strip, the holding strap of the front and/or rear panel can be printed or is printed at least partly on the outside and the second flexible, in some cases hose-like, hollow body of the holding strap is based on an at least partly transparent plastic material, in some cases polyethylene, or consists of the latter. The preceding configurations of the plastic carrier bag according to the present disclosure also make it possible to use the holding strap or straps as information or advertising carriers or for applying design elements.

Furthermore, it is possible for the purposes of the present disclosure that the outer layer consists of an at least partly transparent plastic material, in some cases polyethylene, or consists of the latter which at least can be printed or is printed partly on the inside, in some cases by way of reverse printing. Furthermore, the plastic carrier bag according to the present disclosure comprises alternatively or additionally at least one internal layer, in some cases the inner layer, which is printable or printed on the outside at least partly and wherein the outer layer is based on an at least partly transparent plastic material, in some cases polyethylene, or consists of the latter.

In some cases in order to produce a pleasant feel that is close to the feel of textile holding straps, it has proved to be advantageous that the first flexible, in some cases hose-like, hollow body, in some cases the first flexible plastic material strip or the single or multi-layered material strip not forming a hollow body and/or the second flexible, in some cases hose-like, hollow body, in some cases the second flexible plastic material strip, the holding strap of the front and/or rear panel have an embossed pattern at least in some sections, in some cases over the whole surface. Embossed patterns of this kind can be produced reliably and permanently for example by using thermoplastic plastics, for example polyolefins, by the effect of heat and pressure.

To form an advantageous reinforcing area in one embodiment, it is possible that an extension section adjoins the outer layer, wherein the extension section comprises or has the plastic film strip of the reinforcing area and wherein the extension section extends at least partly along the inner side of the at least one internal layer, in some cases the inner layer, and bears on the latter or can be placed thereon. Said, in some cases at least double-layered, extension section is heat sealed along an extension of or spaced apart from the first side edge in the direction of or up to the second side edge to the inner side of the at least one internal layer, in some cases the inner layer, and/or adhered, in some cases by way of a continuous longitudinal seal. A pragmatic and at the same time distinctive reinforcement is also achieved in that the extension section on the inner side of at least one internal layer, in some cases the inner layer, is formed, in some cases by turning over, at least partly at least in a double-layer. An embodiment has proved to be advantageous here in which the outer layer comprises or forms the opening edge and wherein the at least one internal layer, in some cases the inner layer, with its upper edge extends up to the opening edge or at a distance from the latter.

Alternatively, a reinforcement of a plastic carrier bag according to the present disclosure is achieved in that an extension section adjoins the outer layer, wherein the extension section comprises or represents the plastic film strip of the reinforcing area and wherein the extension section extends at least in sections along the outside of the at least one internal layer, in some cases the inner layer, and bears on the latter or can be placed thereon. Here said, in some cases at least double-layered, extension section is heat sealed and/or adhered along an extension of or spaced apart from the first side edge in the direction of or up to the second side edge to the outside of the at least one internal layer, in some cases the inner layer, and possibly the outer layer, in some cases by a continuous longitudinal seal. Here too a pragmatic and simultaneously distinctive reinforcement can be achieved in that the extension section on the outside of the at least one internal layer, in some cases the inner layer, is designed to be at least double-layered at least in some parts, in some cases by turning over. An embodiment has also proved to be advantageous in this case in which the outer layer surrounds or forms the opening edge, wherein the at least one internal layer, in some cases the inner layer, extends with its upper edge to the opening edge or is spaced apart from the latter.

For many embodiments of the plastic carrier bags according to the present disclosure, it has proved to be pragmatic to form the opening edge with a fold at the upper end of the outer layer or in the transitional area from the outer layer to the extension section.

It has surprisingly been found that it is also possible to reinforce a plastic carrier bag such that an extension section adjoins the at least one internal layer, in some cases the inner layer, wherein the extension section comprises or represents the plastic film strip of the reinforcing area and wherein the extension section extends at least in sections along the inner side of the at least one internal layer, in some cases the inner layer, and bears against the latter or can be placed thereon. In this case, in some cases the at least double-layered, extension section has to be heat sealed and/or adhered along an extension of or spaced apart from the first side edge in the direction of the second side edge or up to the second side edge to the inner side of the at least one internal layer, in some cases the inner layer, and possibly the outer layer, in some cases by way of a continuous longitudinal seal. The extension section on the inside of the at least one internal layer, in some cases the inner layer, is optionally designed to be double-layered at least in sections, in some cases by way of turning over.

Alternatively, a plastic carrier bag according to the present disclosure can also be reinforced significantly and surprisingly in that an extension section adjoins the at least one internal layer, in some cases the inner layer, wherein the extension section comprises or represents the plastic film strip of the reinforcing area, in that said extension section extends at least in sections along the outside of the at least one internal layer, in some cases the inner layer, and bears on the latter or can be placed on the latter. In this case the said, in some cases at least double-layered, extension section is heat sealed and/or adhered along an extension of or spaced apart from the first side edge in the direction of or up to the second side edge to the outside of the at least one internal layer, in some cases the inner layer, and possibly the outer layer, in some cases by way of a continuous longitudinal seal. The extension section on the outside of the at least one internal layer, in some cases the inner layer, is designed to be at least double-layered at least in some parts, in some cases by turning over.

With regard to the aforementioned embodiments, it has also proved to be pragmatic for many embodiments of the plastic carrier bags according to the present disclosure to form the opening edge with a fold on the upper end of the at least one internal layer, in some cases the inner layer, or in the transitional area from the at least one internal layer, in some cases the inner layer, to the extension section.

To form another suitable reinforcing area, it is possible in one configuration that the single or multi-layered, in some cases double-layered, plastic film strip of the reinforcing area is a separate single or multi-layered plastic film strip, which extends at least in sections along the inner side of the at least one internal layer, in some cases the inner layer, and bears on the latter or can be placed on the latter. In this case said separate plastic material strip is heat sealed and/or adhered along an extension of or spaced apart from the first side edge in the direction of the second side edge or up to the second side edge to the inner side of the at least one internal layer, in some cases the inner layer, and possible the outer layer, in some cases by way of a continuous longitudinal seal. Furthermore, it is possible in this embodiment that said separate plastic-material strip on the inner side of the at least one internal layer, in some cases the inner layer, is designed to be at least double-layered at least in some parts, in some cases by turning over.

In a particularly advantageous embodiment in plastic carrier bags according to the present disclosure the outer layer and the extension section of the front panel or the rear panel are designed in one piece. The at least one internal layer, in some cases the inner layer, and the extension section of the front panel or the rear panel can also be designed in one piece. In addition, the outer layers of the front and rear panel can be designed in one piece. Alternatively or in addition the inner layers of the front/rear panel can be designed in one piece. In this way it is surprisingly possible to obtain carrier bags, which can be produced easily and reliably by way of mass production. The aforementioned embodiment also allows efficient access to single origin recycling.

The extension section can be designed for example by turning over or folding back to form at least a double-layer so that the turned over section is folded over inwards in the direction of the inner layer in the manner of edge wrapping. This can also be performed by turning over or folding outwards. A corresponding procedure can be performed with the extension section of the inner layer.

In an advantageous configuration of the plastic carrier bag according to the present disclosure it is also possible that the layer, in some cases the turned over or folded back layer of the single or multi-layered, in some cases double-layered, plastic film strip of the reinforcing area, in some cases the extension section of the outer layer, which bears or can be placed directly on the inner side of the inner layer, has a section in the direction of the opening end, which extends over the upper edge of the inner layer, wherein the section extending over said upper edge is folded over said upper edge of the inner layer and bears or can be placed at least in sections on the outside of the inner layer and/or the inner side of the outer layer. It is possible to obtain particularly user-friendly reusable plastic carrier bags in this way. Thus it has surprisingly been found that in the aforementioned embodiment the upper edge areas of the front and rear panel which rest on one another in the unused stated can be released from one another particularly easily. Said embodiment also gives the customers an impression of very high quality.

In some advantageous embodiment the plastic film strip of the reinforcing area is designed to be double-layered, optionally in such a way that the turned over or folded layer is essentially smaller than the preceding layer before the reversal point. In many cases it is sufficient if the plastic film strip is only turned over or folded back, either inwards or outwards, until the double-layered section obtained is sufficient to secure to the inner and/or outer layer. Said turned over or folded end section can be complete in the securing/joining, for example by way of thermoplastic sealing, or can also have a section which extends slightly beyond said securing area. In the same way it is possible that at the reversal point of the folded or turned over section the fastening or joining, for example thermoplastic sealing, has not yet been performed. Thus, according to a suitable configuration, it is possible that the turned over layer of the double-layered plastic film strip of the reinforcing area, in some cases the extension section, of the front panel forms a turned over end section which does not extend up to the upper edge of the inner and/or outer layer, and its end is present in the fastening of the plastic film strip, in some cases the extension sections, to the outer and/or inner layer or wherein the end section is present at least in sections with the fastening of the plastic film strip, in some cases the extension section, to the outer and/or inner layer and its end is adjacent to said fastening, in some cases is spaced apart not more than 1 cm or 2 cm from the latter. Here it can be alternatively or additionally provided that the turned over layer of the double-layered plastic film strip of the reinforcing area, in some cases the extension section, of the rear panel has a turned over end section which does not extend up to the upper edge of the inner and/or outer layer, and its end is present in the fastening of the plastic film strip, in some cases the extension section, to the outer and/or inner layer or wherein the end section is present at least in sections in the fastening of the plastic film strip, in some cases the extension section, to the outer and/or inner layer and its end is adjacent to said fastening, in some cases is spaced apart not more than 1 cm or 2 cm from the latter.

In an advantageous embodiment of a plastic carrier bag according to the present disclosure, it is possible that the single or multi-layered, in some cases double-layered, plastic film strip of the reinforcing area, in some cases the multi-layered, in some cases double-layered, extension section of the front and/or rear panel, is heat sealed over all layers with the inner side of the at least one internal layer, in some cases the inner layer, along the extension of or spaced apart from the first side edge in the direction of or up to the second side edge, in some cases by a continuous longitudinal seal, forming a first connecting strip, in some cases is thermoplastically sealed and/or adhered, wherein the first connecting strip is in some cases closer to the lower edge of the reinforcing area than to its upper edge, in some cases on or adjacent to the lower edge of the reinforcing area. By using the first connecting strip, in some cases when in the form of a thermoplastic sealing seam, it is possible to achieve a particularly stable opening edge of the plastic carrier bag according to the present disclosure.

The connection or sealing of the plastic film strip or the extension section of the front and/or rear panel to the at least one internal layer, in some cases the inner layer, for example the inner side of the inner layer, generally includes the connection of all of the layers placed thereon. The same applies in general to the joining of the plastic film strip or the extension section of the front and/or rear panel to the outer layer.

In another advantageous embodiment, in addition the outer layer of the front and/or rear panel is heat sealed to the outside of the at least one internal layer, in some cases the inner layer, along the extension of or spaced apart from the first side edge in the direction of or up to the second side edge, in some cases by way of a continuous longitudinal seal, forming a second connecting strip, in some cases is thermoplastically sealed, and/or adhered, wherein the second connecting strip is optionally closer to the lower edge of the reinforcing area than to its upper edge, in some cases on or adjacent to the lower edge of the reinforcing area. In this way an even more reinforced opening edge is obtained. Here it is particularly advantageous if the first and second connecting strip overlap substantially at least in sections, optionally fully.

A particularly high degree of stability and tearing resistance is also achieved in the said embodiments of a plastic carrier bag according to the present disclosure in that the first and second connecting areas of the straps joined to the front panel and/or rear panel, in some cases by way of sealing, are spaced apart from the first and/or second connecting strip, in some cases do not overlap with the first and/or second connecting strip.

In the plastic carrier bags according to the present disclosure, it is advantageous that the outer layer, the single or multi-layered, in some cases double-layered, plastic film strip of the reinforcing area, in some cases the extension section of the inner and/or outer layer, and the at least one internal layer, in some cases the inner layer, of the front and/or rear panel and possibly the holding straps joined to the front panel and/or rear panel, in some cases their first and/or second flexible plastic material strip and/or the single or multi-layered material strip not forming a hollow body, are made of or consist of polyolefins, in some cases polyethylene. Polypropylene can also be used as an alternative to polyethylene. Copolymers can likewise be used with ethylene or propylene as the main component, wherein for the further comonomers for example propylene or ethylene and/or butene, for example 1-butene, or butadiene can be used.

LD-polyethylene is used particularly advantageously as the polyethylene. LD-polyethylene is generally defined by a density range of 0.910-0.940 g/cm$^3$.

In some advantageous embodiments, for all of the components of the plastic carrier bag according to the present disclosure, for example the inner and outer layer of the front and rear panel and the holding straps of the front and rear panel and, if provided, also for the side walls and the base, a uniform plastic material is used continuously, for example polypropylene or polyethylene, polyethylene, and particularly advantageously LD-polyethylene. In this way a single origin plastic carrier bag is obtained which can be easily recycled.

Furthermore, plastic carrier bags according to the present disclosure are particularly suitable in which the at least one internal layer, in some cases the inner layer, of the front and/or rear panel comprises or is a foamed plastic film, such as a foamed polyolefin film, in some cases a foamed polyethylene film and in some further cases a foamed LD-polyethylene film. In this way a textile-like impression can be achieved when handling, for example when folding, the plastic carrier bag according to the present disclosure. Accordingly the first flexible, in some cases hose-like, hollow body or the single or multi-layered material strip not forming a hollow body can also comprise or consist of a foamed plastic film, such as a foamed polyolefin film, in some cases a foamed polyethylene film and in some further cases a foamed LD-polyethylene film.

A particularly high degree of stability and tearing resistance is also achieved in that in the aforementioned embodiments of a non-foamed plastic film, such as a non-foamed polyolefin film, in some cases a non-foamed polyethylene film and in some further cases a non-foamed LD-polyethylene film is used. The combination of a foamed plastic inner layer and a non-foamed plastic outer layer results here surprisingly in particularly mechanically resilient and durably stable plastic carrier bags. The same applies to rather suitable configurations of the holding strap, in which the second flexible, in some cases hose-like, hollow body, in some cases the second flexible plastic material strip, is based on or formed from a non-foamed plastic film, such as a non-foamed polyolefin film, in some cases a non-foamed polyethylene film and in some further cases a non-foamed LD-polyethylene film.

Thus, in a very advantageous embodiment, it is possible that the outer layer, the single or multi-layered, in some cases double-layered, plastic film strip of the reinforcing area, in some cases the extension section of the inner or outer layer, and the at least one internal layer, in some cases the inner layer, of the front and rear panel and possibly the holding straps connected to the front panel and rear panel, in some cases their first and/or second flexible plastic material strip or their single or multi-layered material strip not forming a hollow body are formed of or consist of polyethylene, in some cases LD-polyethylene, wherein the at least one internal layer, in some cases the inner layer, of the front and rear panel is a foamed polyethylene film, in some cases a foamed LD-polyethylene film, and wherein the outer layer of the front and/or rear panel, and possibly the single or multi-layered plastic film strip of the reinforcing area, is a non-foamed polyethylene film, in some cases a non-foamed LD-polyethylene film. In this case plastic carrier bags are particularly suitable in which the first flexible, in some cases hose-like, hollow body or the single or multi-layered material strip not forming a hollow body of the holding strap of the front and/or rear panel, in some cases the first flexible plastic material strip, is formed of or consists of foamed polymer material, such as foamed polyethylene, and in some cases foamed LD-polyethylene, and wherein optionally the second flexible, in some cases hose-like, hollow body of the holding strap of the front and/or rear panel, in some cases the second flexible plastic material strip, is formed of or consists of non-foamed polymer material, such as non-foamed polyethylene, and in some cases non-foamed LD-polyethylene.

For the purposes of the present disclosure the outer layer, the single or multi-layered, in some cases double-layered, plastic film strip of the reinforcing area, in some cases the extension section of the inner or outer layer, and/or the at least one internal layer, in some cases the inner layer, of the front and/or rear panel are advantageously in the form of film.

The plastic carrier bag according to the present disclosure, in some cases the single-origin plastic carrier bag according to the present disclosure, can be designed such that the outer layer, the single or multi-layered, in some cases double-layered, plastic film strip of the reinforcing area, in some cases the extension section of the inner or outer layer, and/or the at least one internal layer, in some cases the inner layer, of the front and/or rear panel and possibly the holding straps joined to the front panel and/or the rear panel, in some cases their first and/or second flexible plastic material strip or the single or multi-layered material strip forming a hollow body, can contain or consist of recycled plastic material, in some cases recycled polyolefins, for example polyethylene.

The present disclosure also provides a holding strap for a plastic carrier bag containing a first flexible, in some cases hose-like, hollow body and/or a single or multi-layered material strip not forming a hollow body, in some cases a plastic material strip, and a second flexible, in some cases hose-like, hollow body, which encloses at least in some sections, in optionally fully, the first flexible hollow body. In this case such holding straps are rather suitable in which the first flexible, in some cases hose-like, hollow body or the single or multi-layered materials trip not forming a hollow body and the second flexible, in some cases hose-like, hollow body surrounding said first flexible hollow body or said single or multi-layered material strip are joined together at least in sections, in some cases heat sealed, in some other cases along a optionally continuous, strip web.

According to an advantageous embodiment of the holding strap according to the present disclosure, it is possible here that the first flexible, in some cases hose-like, hollow body is formed from a first flexible plastic material strip with opposite first and second longitudinal side edges, the opposite first and second longitudinal side edges of which are heat sealed to one another in an overlapping area, in such as thermoplastically sealed and/or adhered and/or the second flexible, in some cases hose-like, hollow body is formed from a second flexible plastic material strip with opposite first and second longitudinal side edges, the opposite first and second longitudinal side edges of which are heat sealed to one another in a second overlapping area, in some cases are thermoplastically sealed and/or adhered.

In an advantageous embodiment the holding straps according to the present disclosure can also be characterized in that the first plastic material strip of the first flexible hollow body and the second plastic material strip of the second flexible hollow body are heat sealed to one another at least in sections, in some cases along the first and second overlapping areas, in some cases thermoplastically sealed and/or adhered.

In addition, holding straps according to the present disclosure are rather suitable in which the first flexible hollow body is formed by a first flexible plastic material strip with opposite first and second longitudinal side edges and the second flexible hollow body is formed by a second flexible plastic material strip with opposite first and second longitudinal side edges. In the overlapping area of the first and second longitudinal side edge of the first flexible plastic material strip the first longitudinal side edge of the first plastic material strip is heat sealed to the first longitudinal side edge of the second material strip and said first longitudinal side edge of the second plastic material strip is heat sealed to the second longitudinal side edge of the first plastic material strip, in some cases thermoplastically sealed and/or adhered. In the overlapping area of the first and second longitudinal side edge of the second flexible plastic material strip the second longitudinal side edge of the first plastic material strip is heat sealed to the second longitudinal side edge of the second material strip and said second longitudinal side edge of the first plastic material strip is heat sealed to the first longitudinal side edge of the second plastic material strip, in some cases thermoplastically sealed and/or adhered.

Holding straps according to the present disclosure have proved to be particularly practical both with regard to the manufacture of the plastic carrier bags and the production and layering, in which the latter are pressed flat forming two opposite longitudinal folding edges. The overlapping areas of the opposite first and second longitudinal side edges of the first and second flexible plastic material strips of the first and second flexible hollow bodies are provided between opposite longitudinal folding edges and in some cases on the same side.

The holding straps according to the present disclosure are surprisingly also suitable for the production of colored straps or straps labelled with information, which do not experience signs of wear even after multiple use, for example from abrasion. In this case, it is possible that the second flexible plastic material strip forming or containing the second flexible hollow body of the holding strap is based on an at least partly transparent plastic material, in some cases polyethylene, which is printable or printed at least partly on the inside, in some cases by way of reverse printing.

A particularly high degree of stability and carrying comfort as well as a textile-like appearance is also achieved for the holding strap according to the present disclosure in that the first and/or second flexible plastic material strips have an embossed pattern at least in sections, in some cases over the whole surface.

Such holding straps according to the present disclosure are particularly advantageous in which the first flexible, in some cases hose-like, hollow body, in some cases the first flexible plastic material strip, and/or the single or multi-layered material strip not forming a hollow body and/or the second flexible, in some cases hose-like, hollow body, in some cases the second flexible plastic material, are formed from or consist of polyolefins, in some cases polyethylene. In this case LD-polyethylene is optionally used.

With regard to the durability and mechanical stress resistance such holding straps according to the present disclosure are surprisingly particularly suited in which the first flexible, in some cases hose-like, hollow body, in some cases the first flexible plastic material strip, and/or the single or multi-layered material strip not forming a hollow body, are based on or formed from a foamed plastic film, such as foamed polyolefin film, in some cases a foamed polyethylene film and in some further cases a foamed LD-polyethylene film, wherein advantageously the second flexible, in some cases hose-like, hollow body, in some cases the second flexible plastic material strip, is based on or formed from a non-foamed plastic film, such as a non-foamed polyolefin film, in some cases a non-foamed polyethylene film and in some further cases a non-foamed LD-polyethylene film.

FIG. 1a shows a schematic cross-sectional view of parts of a plastic carrier bag 1 according to the present disclosure. The latter comprises, as shown by way of example in FIG. 11, a bottom end 2 and an opposite opening end 4 with a front panel 6 and a rear panel 8. The front and rear panel have an opening edge 14 and a bottom edge 16, which when spread out flat generally define the maximum dimensions of the body of the plastic carrier bag. In the shown embodiment of the section of a plastic carrier bag 1 according to the present disclosure, the carrying loops are not shown to give a clearer overview. In the shown embodiment, the front panel 6 and the rear panel 8 are both double-layered, formed by an inner layer 28 or 32 and an outer layer 30 or 34. The outer layer 30 of the front panel 6 passes at the upper end to an extension section 36. The latter is guided around the upper edge 40 of the inner layer 28 on its inner side. In the embodiment shown in FIG. 1a, the double-layered configuration of the extension section 36 is formed by turning over the film web towards the inner panel or inner layer 28, so that the inner section of the extension section 36 is guided in the direction of the upper edge 40 of the inner layer 28. The double-layered extension section 36 in the embodiment shown in FIG. 1a is heat sealed in the lower section 48, advantageously at a distance from the reversal point 50 to the inner layer 28 in a connecting area 52. Thus at the opening end 4, there is a reinforcing area 44, which provides a very stable, highly mechanically resilient and reusable plastic carrier bag. The double layering of the front and rear panel 6 or 8 also extends to the bottom area (see also FIG. 10). Thus in the embodiment of a plastic carrier bag 1 according to the present disclosure, the extension section 36 of the outer layer 30 of the front panel 6, said outer layer of the front panel and the outer layer 34 rear panel and the extension section 38 joined onto the upper end, including the section forming the bottom area, can be formed from a one-piece plastic film. In the same way in the embodiments shown in FIG. 1a or FIG. 10, the inner layer 28 of the front panel 6 and the inner layer 32 of the rear panel 8, including the passage forming the bottom area, are formed as a one-piece film web. The plastic carrier bag 1 according to FIG. 1a is highly mechanically resilient and enables repeated use and makes it possible to carry heavy loads without any negative impact.

Figure 1B:
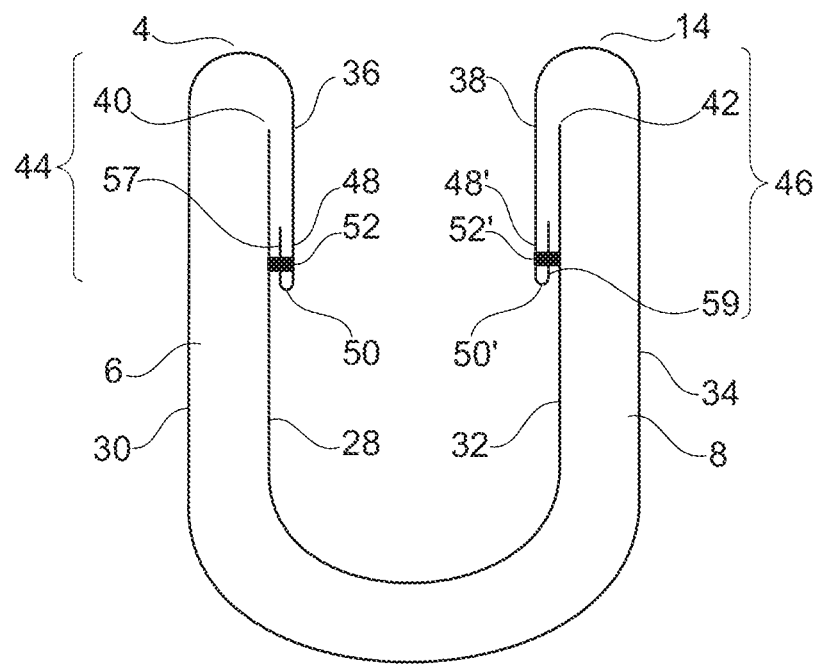
FIG. 1b shows a schematic cross-sectional view of a section of a modification of the first embodiment of a plastic carrier bag according to the present disclosure.

The embodiment of a plastic carrier bag 1 of the present disclosure according to FIG. 1b differs from the one according to FIG. 1a in that the turned over end section 57, 59 of the extension section 36, 38 does not extend to the upper edge 40, 42 of the inner layer 28, 32, but only extends slightly over the connection for example by way of heat sealing 52, 52', the extension section 36, 38 to the inner layer 28, 32. Of course it is also possible that the joining or heat sealing is provided directly at the end of said turned over end section 57, 59. For example, for many practical applications, said turned over end section can have an extension of about 0.5 to 1.0 cm or less.

Figure 2:
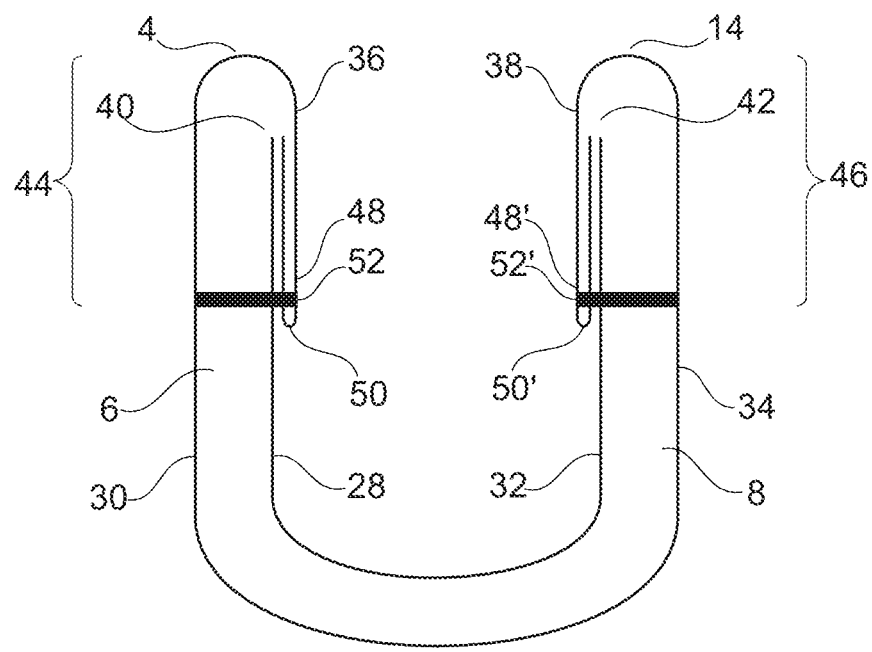
FIG. 2 shows a schematic cross-sectional view of a section of a second embodiment of the plastic carrier bag according to the present disclosure.

FIG. 2 shows a section of a further embodiment of a plastic carrier bag 1 according to the present disclosure. This differs from the embodiment according to FIG. 1a in that the heat sealing 52, 52' not only encompasses the double-layered extension section 36, 38 and the inner layer 28, 32 but also the includes the join of the outer layer 30.

Figure 3:
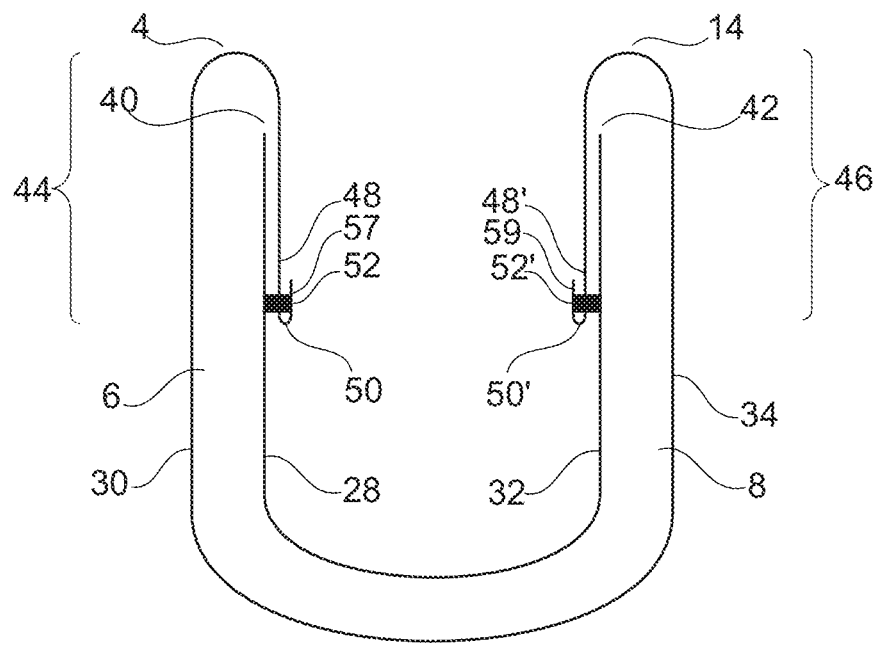
FIG. 3 shows a schematic cross-sectional view of a section of a third embodiment of the plastic carrier bag according to the present disclosure.

FIG. 3 shows a section of a further embodiment of a plastic carrier bag 1 according to the present disclosure. The latter differs from the embodiment according to FIG. 1b in that the extension sections 36 and 38 are thus designed to be double-layered, the turning over or folding back is not in the direction of the inner side of the inner film but away from the latter. Also in this configuration double-layered extension sections are formed which form reinforcing sections together with the overlapping areas of the inner layer and the associated sections of the outer layers. Unlike the embodiment according to FIG. 2, similar to the embodiment of FIG. 1b, the turned over section 57, 59 are kept short and are only present in the lower area 48, 48' of the reinforcing section.

Figure 4A:
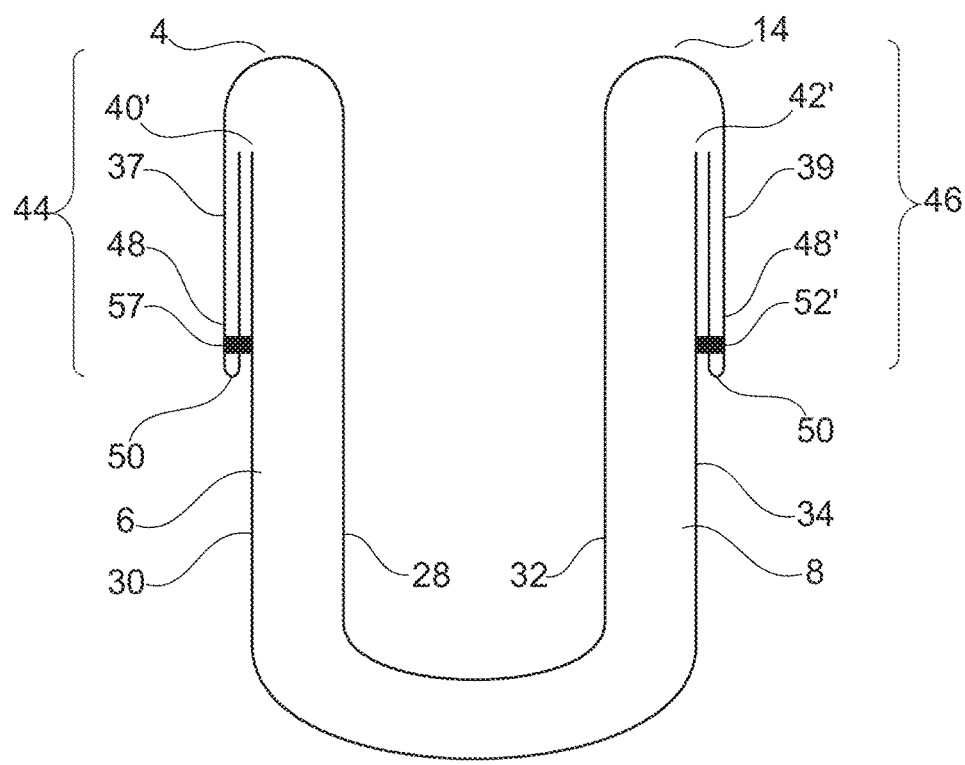
FIG. 4a shows a schematic cross-sectional view of a section of a fourth embodiment of the plastic carrier bag according to the present disclosure.

The embodiment of a plastic carrier bag according to the present disclosure, as shown in sections in FIG. 4a, differs from the one according to FIG. 1a in that the extension sections 37, 39 do not adjoin the upper end of the outer layers 30, 34 of the front or rear panel 6, 8 but the corresponding inner layers 28 and 32. The extension sections 37, 39 are folded in a double-layer over the upper edge 40' or 42' of the front panel 6 and rear panel 8. The joining of the thus formed reinforcing sections via heat sealing lines 52 or 52' is similar to the heat sealing lines of the embodiment according to FIG. 1a.

Figure 4B:
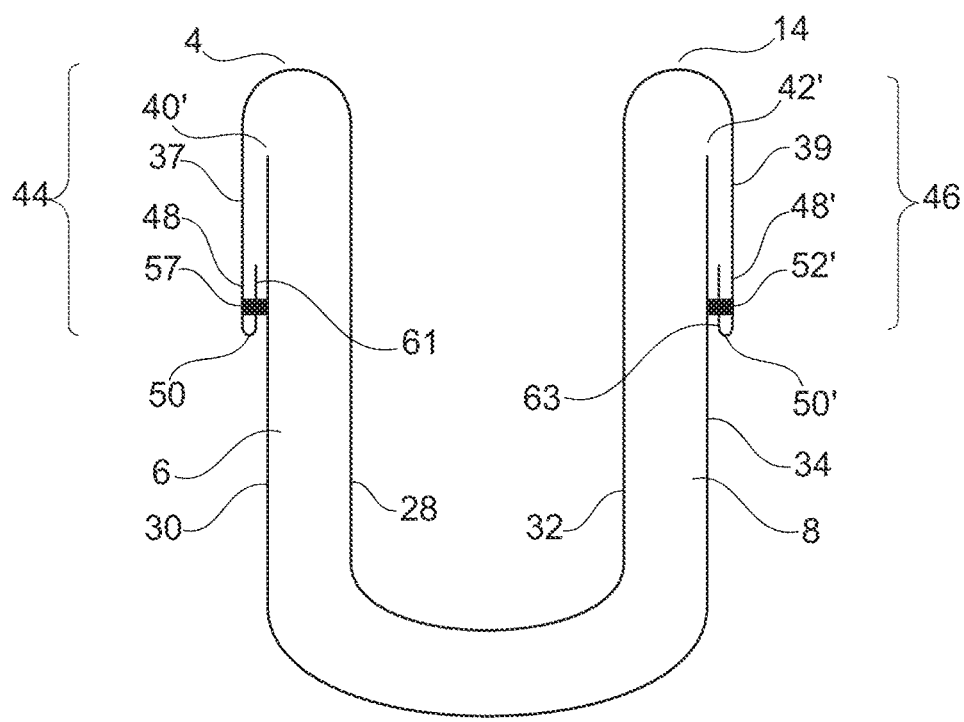
FIG. 4*b* shows a schematic cross-sectional view of a section of a modification of the fourth embodiment of a plastic carrier bag according to the present disclosure.

The embodiment of a plastic carrier bag 1 of the present disclosure according to FIG. 4b differs from the one according to FIG. 4a in that the turned over end section 61, 63 of the extension section 37, 39 does not extend up to the upper edge 40', 42' of the outer layer 28, 32, but only extends slightly over the join for example by heat sealing 52, 52' the extension section 37, 39 to the outer layer 30, 34. Of course it is also possible that the join or seal is formed directly at the end of said turned over end section 61, 63. For example, for many practical applications, said turned over end section can have an extension in the region of about 0.5 to 1.0 cm or less.

Figure 5:
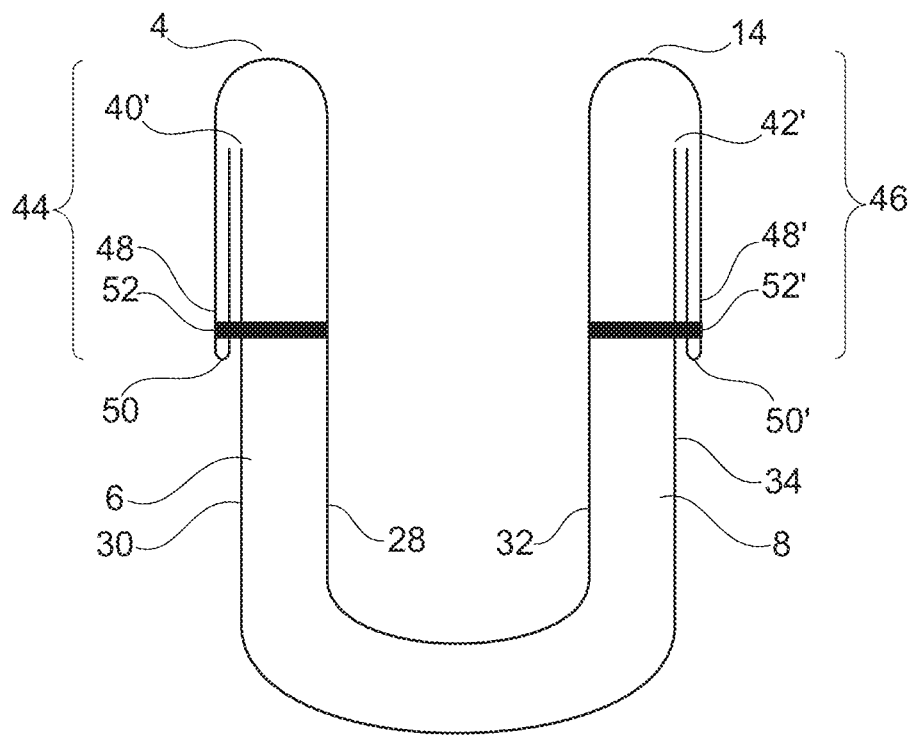
FIG. 5 shows a schematic cross-sectional view of a section of a fifth embodiment of the plastic carrier bag according to the present disclosure.

The embodiment according to FIG. 5 differs from that of FIGS. 4a and 4b in that the heat sealing 52, 52' not only includes the double-layered extension section 36, 38 and the outer layer 30, 34 but also the join of the inner layer 28, 32.

Figure 6:
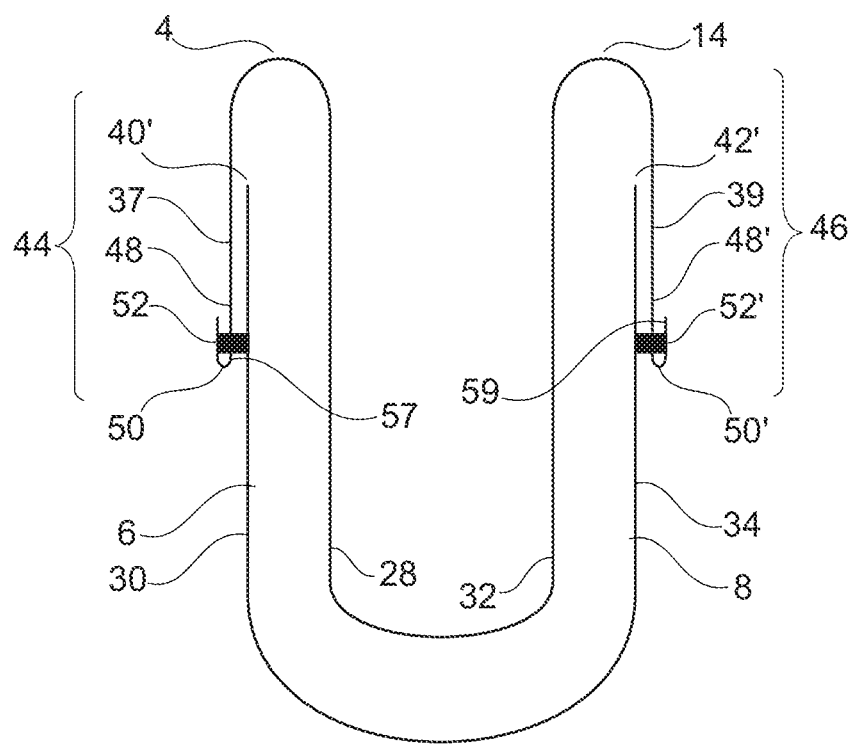
FIG. 6 shows a schematic cross-sectional view of a section of a sixth embodiment of the plastic carrier bag according to the present disclosure.

The embodiment according to FIG. 6 differs from that according to FIG. 5 in that the extension sections 36 and 38 are designed to be double-layered, and the turning over or folding back does not take place in the direction of the inner side or inner film but is away from the latter. For example, in this embodiment there are also double-layered extension sections which together with the overlapping areas of the outer layer and the associated sections of the inner layers form reinforcing sections. Similar to the embodiment according to FIG. 4b, the turned over end section 57, 59 of the extension section 37, 39 does not extend up to the upper edge 40', 42' of the inner layer 28, 32, but only slightly over the join, for example by way of heat sealing 52, 52', of the extension sections 37, 39 to the outer layer 30, 34.

Figure 7:
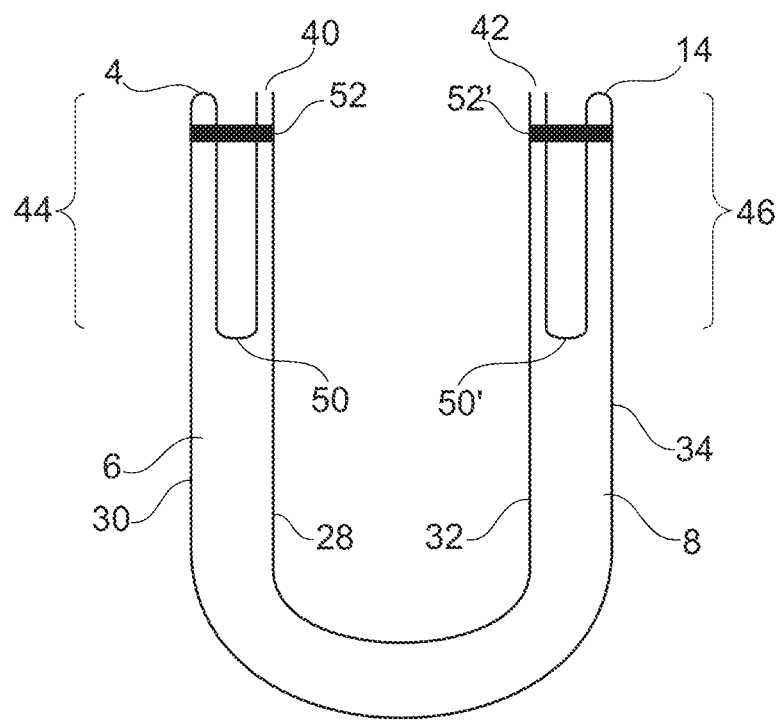
FIG. 7 shows a schematic cross-sectional view of a section of a seventh embodiment of the plastic carrier bag according to the present disclosure.

In the embodiment of a plastic carrier bag according to the present disclosure according to FIG. 7, the reinforcing area 44, 46 is formed by turning over the extension section 36, 38 of the outer layer 30, 34. Unlike the embodiment according to FIG. 1a for example, the extension section is not brought over the upper edge 40, 42 of the inner layer 28, 32. Rather the turned over, double-layered extension section is positioned on or adjacent to the outside of the inner layer 28, 32. The joining of the outer layer, extension section and inner layer is performed in the shown embodiment by a heat sealing join 52, 52' extending over all layers.

Figure 8:
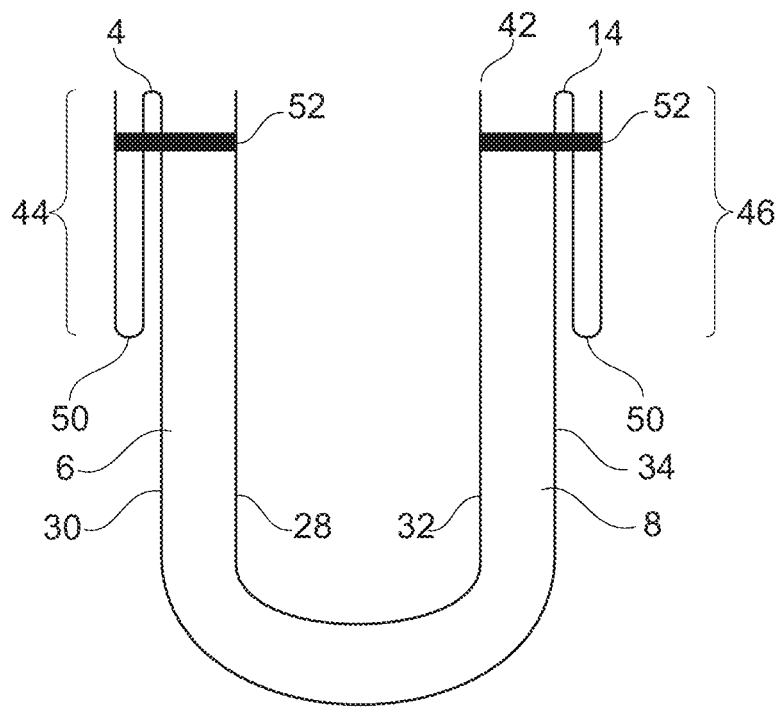
FIG. 8 shows a schematic cross-sectional view of a section of an eighth embodiment of the plastic carrier bag according to the present disclosure.

The embodiment of a plastic carrier bag of the present disclosure according to FIG. 8 differs from the one according to FIG. 7 in that the extension section 36, 38 which adjoins the outer layer 30, 34 is not turned over and folded back in the direction of the inner layer 28, 32, but away from the latter.

Figure 9:
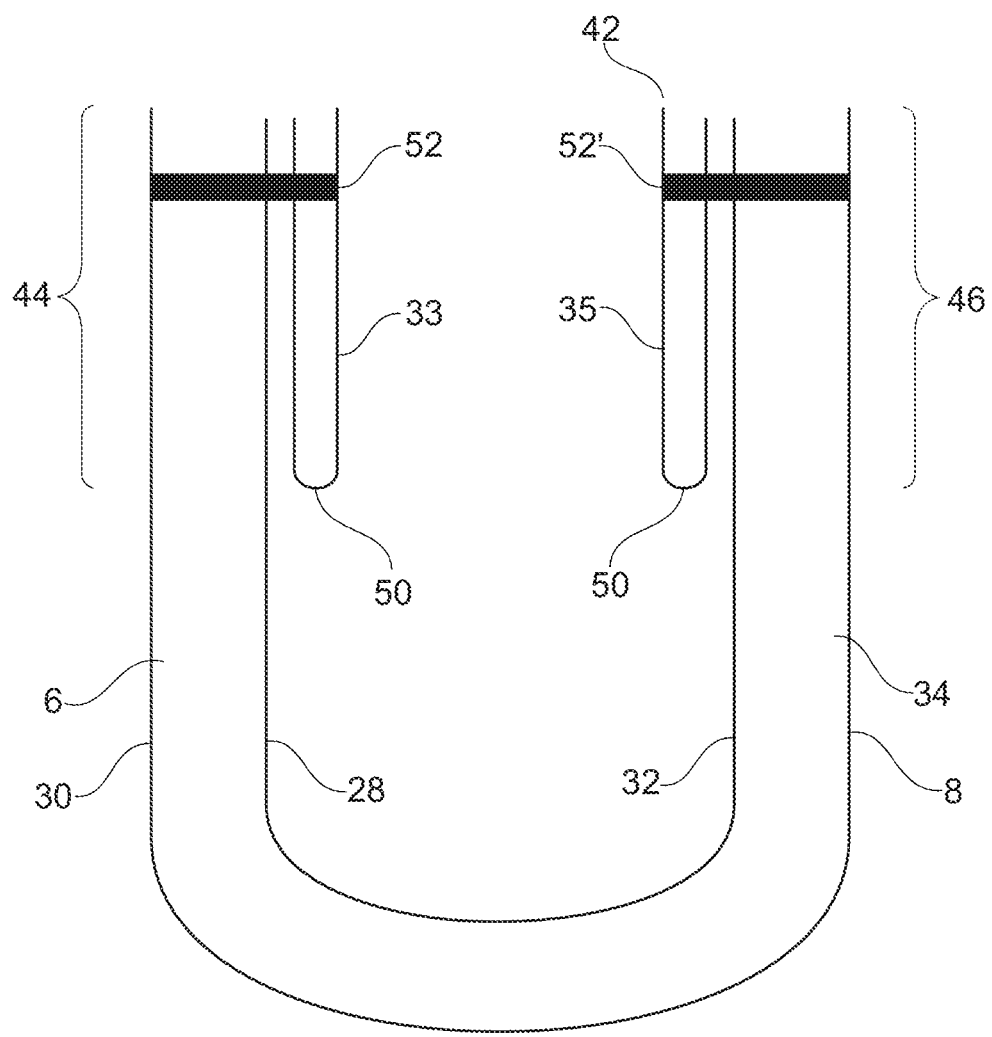
FIG. 9 shows a schematic cross-sectional view of a section of a ninth embodiment of the plastic carrier bag according to the present disclosure.

The embodiment of a plastic carrier bag of the present disclosure according to FIG. 9 is formed in that a separate film strip 33, 35 folded in a double-layer is provided respectively on the inner layer of the front and rear panel in the upper section or at the upper end of the plastic carrier bag and forms a reinforcing area by way of heat sealing 52, 52' together with the respective inner and outer layer.

Figure 10:
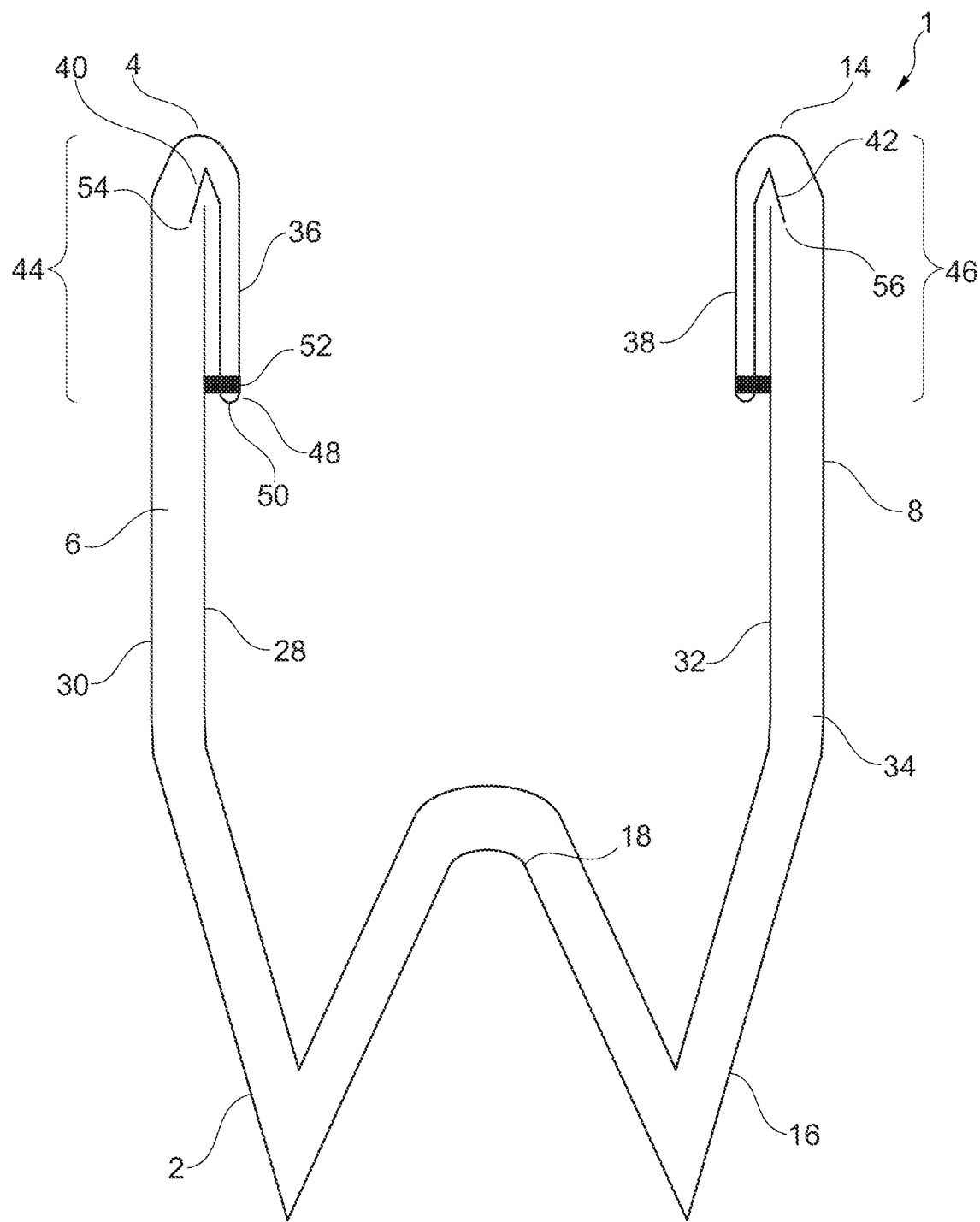
FIG. 10 shows a schematic cross-sectional view of a tenth embodiment of the plastic carrier bag according to the present disclosure.

FIG. 10 shows a schematic cross-section of an embodiment of a plastic carrier bag 1 according to the present disclosure. The inner layer 28 and 32 of the front and rear panel 6, 8 are designed in one piece, including the bottom area. The same applies to the outer layers 30, 34, including the bottom area, of the front and rear panel. In addition, the outer layers have extension sections 36 and 38, which are turned over on the inside. In the reinforcing area 44 or 46 the folded extension section 36, 38 is heat sealed to the inner layer of the front and rear panel. To create an upper edge of the carrier bag with more volume, the extension sections are turned over again at the end over the upper edge 40 or 42 of the inner layers of the front and rear panel.

Figure 11:
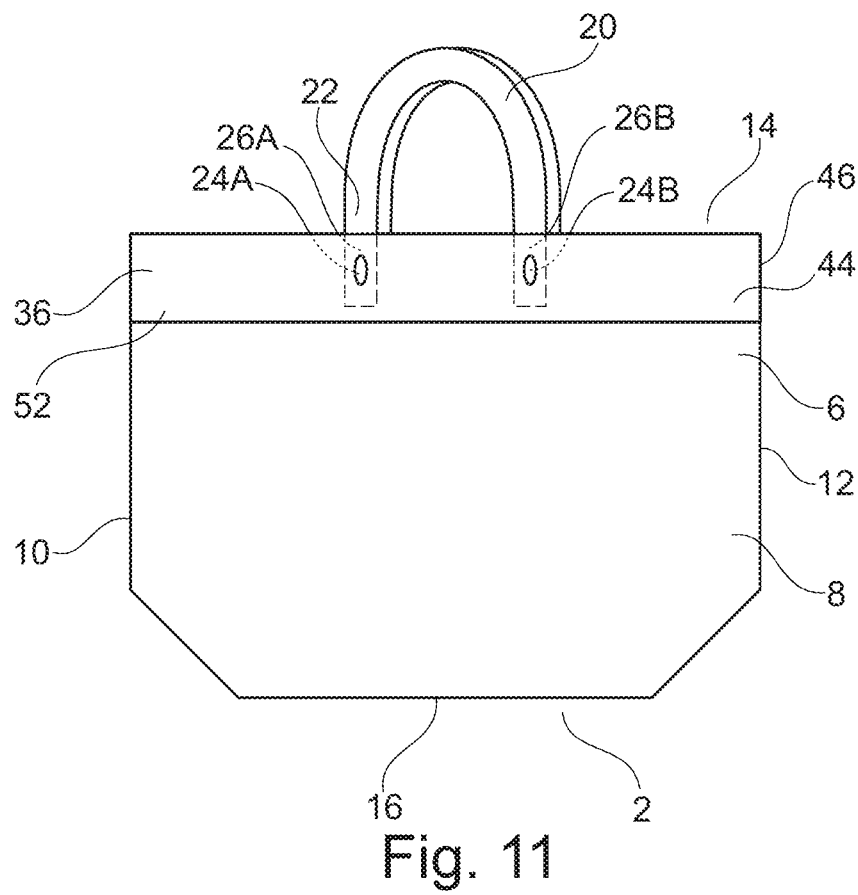
FIG. 11 shows a schematic side view of a plastic carrier bag according to the present disclosure.

FIG. 11 shows a plastic carrier bag 1 according to the present disclosure in a schematic side view. The bag body comprises a bottom end 2 and an opposite opening end 4 with a front panel 6 and a rear panel 8. The front and rear panel have an opening edge 14 and a bottom edge 16, which when folded out flat generally show the maximum extension of the body of the plastic carrier bag. The holding straps 20 and 22 of the front and rear panel 6 or 8 are attached on the inside in the reinforcing areas 44, 46 of the front or rear panel 6, 8. The respective connecting areas 24A, 24B and 26A, 26B are accordingly shown by dashed lines in the drawing. The carrier bag according to the present disclosure can thus be filled particularly easily. In the shown embodiment of a plastic carrier bag 1 according to the present disclosure, it is also in some cases an advantage that the said connecting areas of the holding strap do not overlap with the connecting sealing seam 52, by way of which the plastic film strip or extension section 36 is heat sealed to the front or rear panel.

Figure 12:
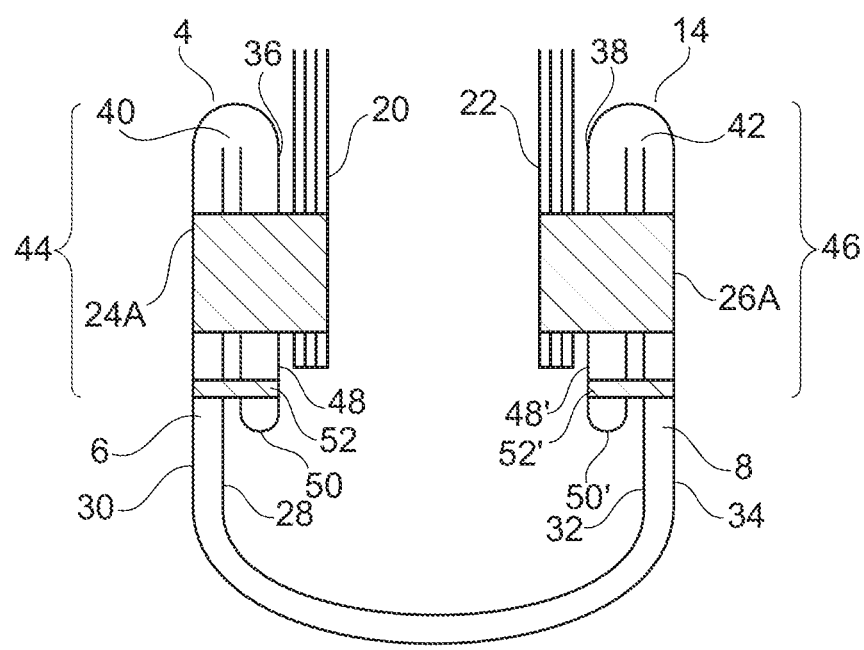
FIG. 12 shows a schematic cross-sectional view of a section of an eleventh embodiment of a plastic carrier bag according to the present disclosure.

In the embodiment shown in FIG. 12, the extension section 36, 38 is shown heat sealed to its turned over end section 50 and also joined to the inner side of the inner layer 28, 32 by way of heat sealing. Also the inner layer is joined at said joining point 52, 52' to the outer layer 30, 34 by way of heat sealing. The holding strap 20, 22 also shown in section in FIG. 12 is heat sealed in the shown first joining area 24A, 26A on the inside to the turned over double-layered extension section 36, 38. The holding strap 20, 22 can in this way, as shown in FIG. 12, be formed by a first flexible hose-like hollow body and a second flexible hose-like hollow body, which encases the first hollow body. There is thus a first hose-like structure inside a second hose-like structure. The first and second flexible hose-like hollow bodies advantageously rest on first and second flexible plastic material strips, wherein the first flexible plastic material strip comprises opposite first and second longitudinal side edges, which in the hose-like design of the hollow body form an overlapping area. In the same way, the second flexible hose-like hollow body can rest on a flexible material strip, which has opposite first and second longitudinal side edges, which in the hose-like configuration form an overlapping area. Furthermore, in said joining area 24A, 26A the outer layer, the inner layer and the turned over extension section 36, 38 are heat sealed to one another respectively. In this way, a very stable, highly mechanically resilient plastic carrier bag is obtained. In addition, by attaching the holding strap on the inside, it is possible to ensure the straightforward filling of the plastic carrier bag according to the present disclosure. The upper ends or opening edges are prevented by the holding straps from acting as protruding edges when filling with items.

Figure 13:
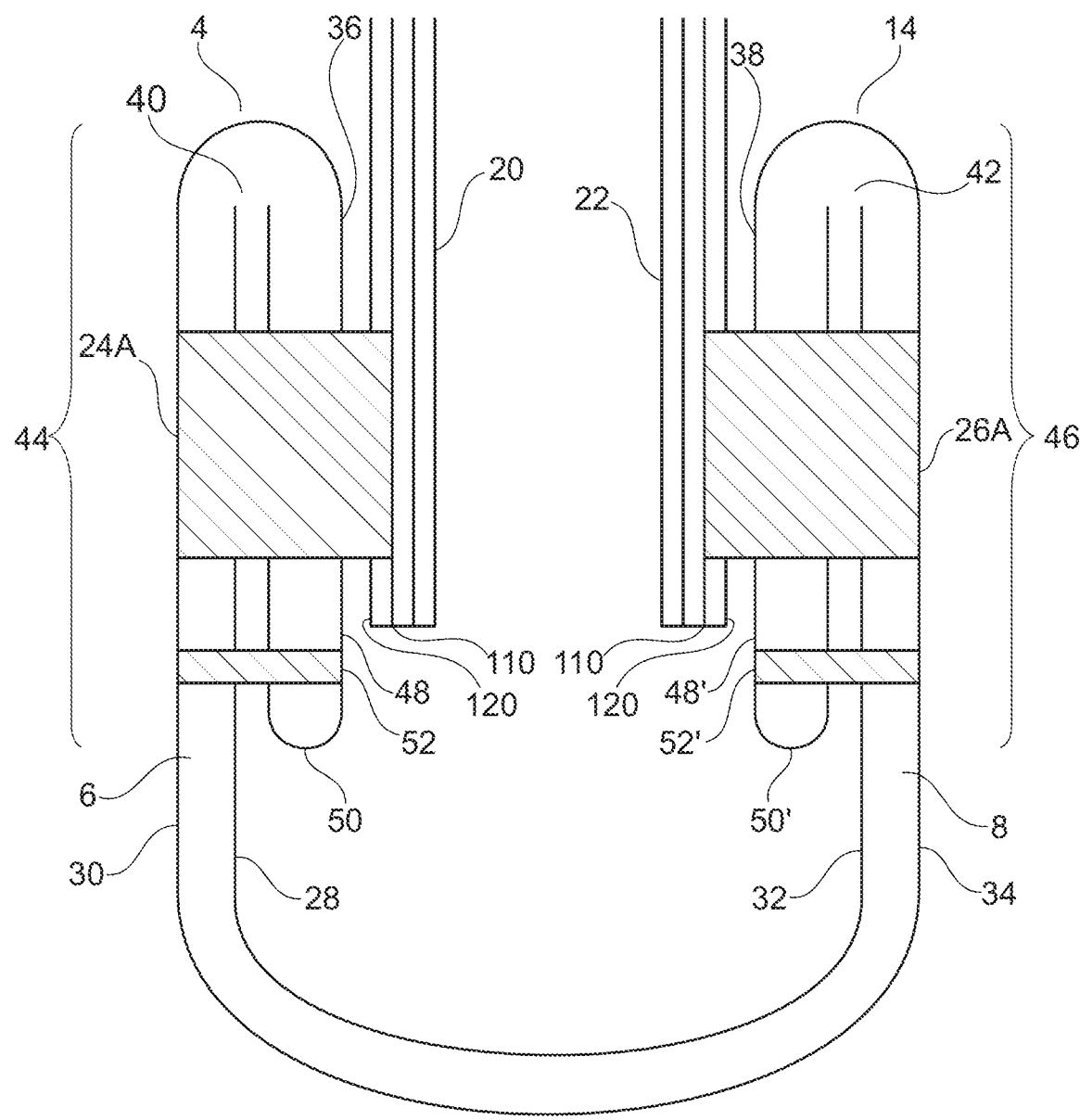
FIG. 13 shows a schematic cross-sectional view of a section of a twelfth embodiment of a plastic carrier bag according to the present disclosure.

The embodiment according to FIG. 13 differs from the one according to FIG. 12 in that only the outside of the extension section 36, 38 is connected to the outside of the second hollow body 120 of the holding strap 20, 22 in the joining area 24A or 26A, in some cases are sealed thermoplastically, and wherein furthermore, the inner side of the second hollow body 120 is joined to the outside of the inner hollow body 110, in some cases sealed thermoplastically. However, in this embodiment, in the connecting areas of the holding straps the adjoining inner sides of the inner flexible first hollow body 110 are not joined to one another, in some cases are not sealed together thermoplastically, and also are not joined together, in some cases are not sealed together thermoplastically, outside of the inner flexible first hollow body 110 oriented in the direction of the inside of the bag, i.e., to the opposite bag panel with the adjacent section of the inside of the outer flexible second hollow body 120. It has surprisingly been found that even with this type of connection of the holding strap to the plastic carrier bag in the region of the reinforcing area, it is possible to achieve a very stable, durably resilient, reliably reusable plastic carrier bag.

Figure 14:
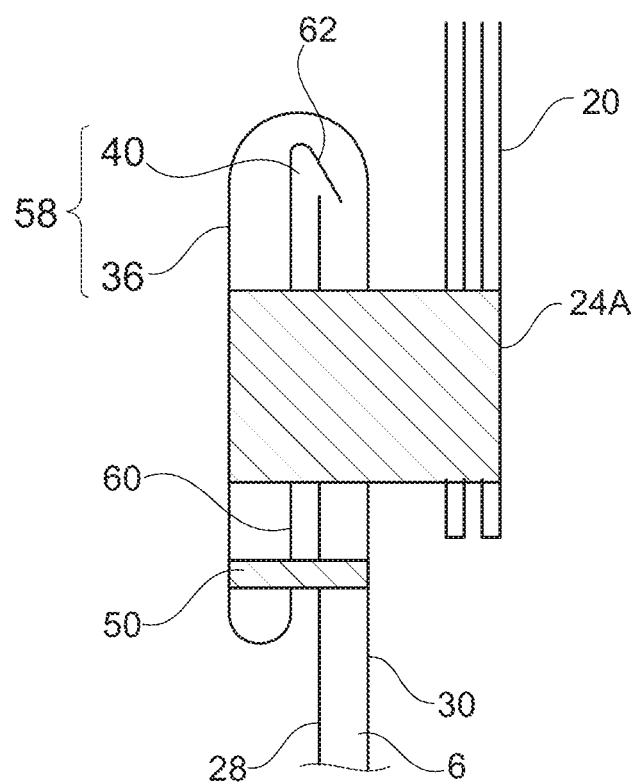
FIG. 14 shows a schematic cross-sectional view of a section of a thirteenth embodiment of a plastic carrier bag according to the present disclosure.

In the embodiment shown in FIG. 14, the extension section 36 with its turned over end section 60 is heat sealed and also joined by sealing to the inside of the inner layer 28. The inner layer is also joined at said connecting point 52, 52' to the outer layer 30 by way of heat sealing. The holding strap 20 which is also shown in section in FIG. 14 is heat sealed in the shown first connecting area 24A to the outside of the outer layer 30. Here, similar to the embodiment according to FIG. 12 and unlike FIG. 13, all of the layers of the first and second hollow body of the holding strap in the joining area are heat sealed together. Furthermore, in said connecting area 24A the outer layer, the inner layer and the turned over extension section 36 are sealed together respectively. In this way a very stable, highly mechanically resilient plastic carrier bag can be obtained.

The previously described embodiments of a holding strap according to the present disclosure are particularly suitable for providing printed straps. By printing the inner side of the second plastic material strip, which forms the outer hose-like hollow body, it is possible to obtain a holding strap holding patterns, information or which is colored, which is highly resistant to mechanical stresses. For this, in some suitable cases transparent second plastic material strips are used which are printed on the inside, such as by way of a reverse printing method.

Figure 15:
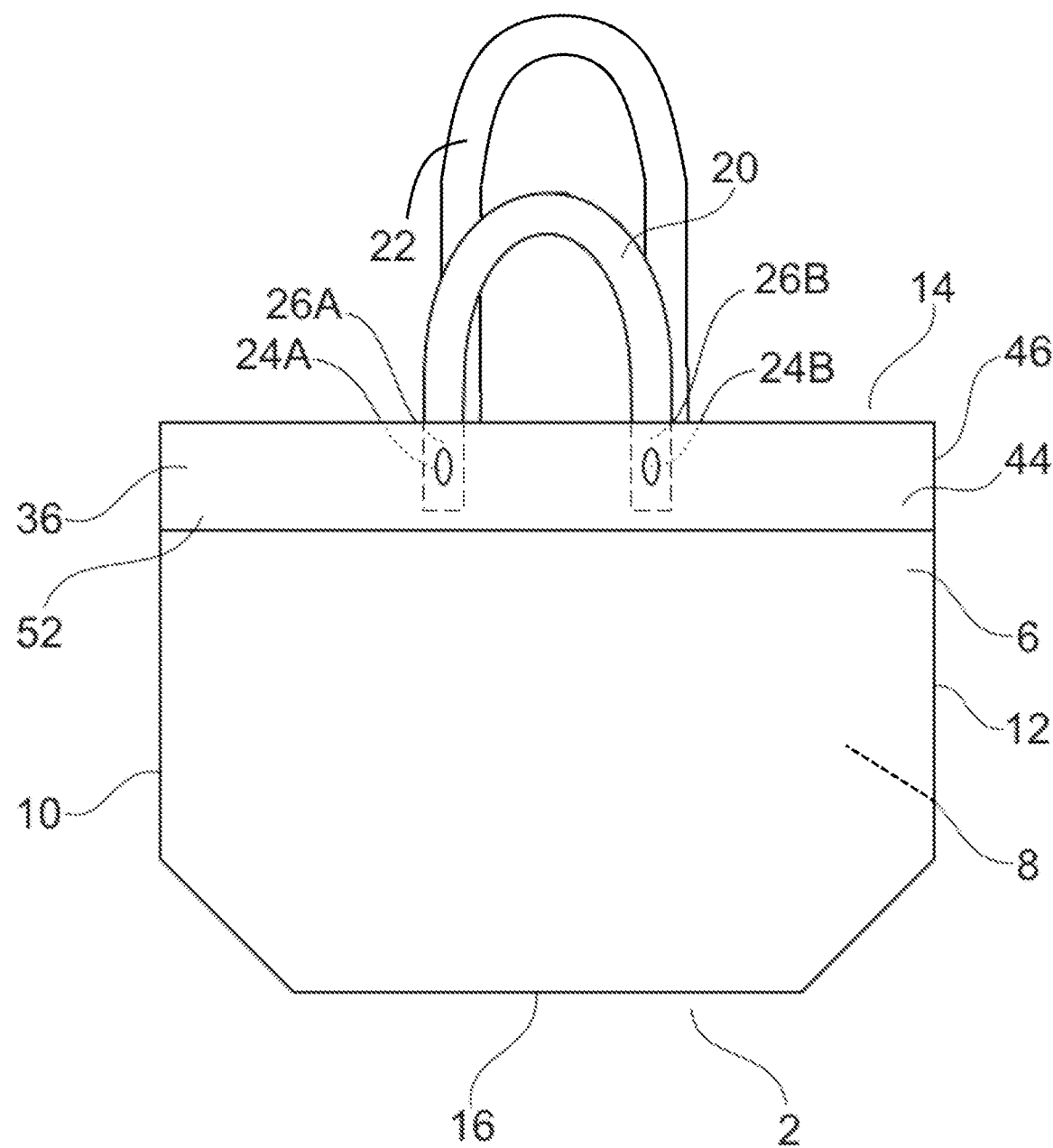
FIG. 15 shows a schematic side view of another plastic carrier bag according to the present disclosure.

FIG. 15 shows another plastic carrier bag according to the present disclosure in a schematic side view. Similar to the plastic carrier bag shown in FIG. 11, the bag body comprises a bottom end 2 and an opposite opening end 4 with a front panel 6 and a rear panel 8. The plastic carrier bag in FIG. 15 has first and second holding straps 20, 22 joined to the rear panel 8 respectively in first and second connecting areas 24A, 26A and 24B, 26B, wherein the first holding strap 22 has a greater extension between the associated first and second connecting areas than the second holding strap 20. One holding strap or one pair of holding straps can be provided in this way for carrying by hand and an additional holding strap or pair of holding straps can be provided for carrying the plastic carrier bag over the shoulder. The first and second connecting areas 24A, 26A and 24B, 26B of the first and second holding straps 20, 22 of the rear panel 8 can thus be arranged congruently above one another or can be made in one process or can be separate from one another. In the latter embodiment, it has proved to be advantageous if the first and second connecting areas of the shorter strap 20, that is, the strap with the smaller extension between said connecting areas, are on the rear panel between the first and second connecting areas of the longer strap 22. Alternatively or in addition, the plastic carrier bag can have first and second holding straps connected to the front panel 6 respectively in first and second connecting areas, wherein the first holding strap has a greater extension between the associated first and second connecting areas than the second holding strap.

The features of the present disclosure disclosed in the above description, in the claims and drawings can be seen as essential to the present disclosure in its various embodiments in any combination.

The various embodiments described above can be combined to provide further embodiments. All of the foreign patents and applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A plastic carrier bag, comprising:
a closed or substantially closed bottom end and an opposite opening end;
a front panel and a rear panel, each with a first side edge and an opposite second side edge and an opening edge and a bottom edge,
wherein the front panel and the rear panel are joined together in the region of their first and second side edges and their bottom edges, at least in sections, either directly or via side walls or side folds and/or a bottom fold, respectively; and
at least one holding strap joined to the front panel and/or at least one holding strap joined to the rear panel, each with a first connecting area and a second connecting area,
wherein:
the front and rear panels are multi-layered comprising at least one internal layer and an outer layer,
the front and rear panels in the area of the opening end have a reinforcing area containing at least one single or multi-layered plastic film strip secured to the inside or outside of the front panel and at least one single or multi-layered plastic film strip secured to the inside or outside of the rear panel, said plastic film strips extending from, or spaced apart from, the first side edge in the direction of the second side edge or up to the second side edge,
the at least one holding strap joined to the front panel in its first and second connecting areas and/or the at least one holding strap joined to the rear panel in its first and second connecting areas, in the region of the respective first to second connecting areas comprises, at least in some sections, a first flexible hollow body or a single or multi-layered material strip not forming a hollow body which is surrounded at least in sections by a second flexible hollow body,
the at least one holding strap joined to the front panel and/or the at least one holding strap joined to the rear panel is heat sealed or adhered, respectively, in its first and second connecting areas, directly or indirectly, to the single or multi-layered plastic film strip of the reinforcing area, and to the at least one internal layer and the outer layer, and
in said first and second connecting areas, at least an inner side of the second flexible hollow body of the at least one holding strap is heat sealed or adhered to the outside of the first flexible hollow body or a facing side of the single or multi-layered material strip not forming a hollow body.

2. The plastic carrier bag according to claim 1, wherein:
the at least one holding strap joined to the front panel and/or the at least one holding strap joined to the rear panel are heat sealed or adhered, respectively, in their first and second connecting areas to the single or multi-layered plastic film strip of the reinforcing area, and/or
the single or multi-layered plastic film strip of the reinforcing area of the front panel is secured to the inner and/or outer layer by way of heat sealing and/or adhesion, and/or
the single or multi-layered plastic film strip of the reinforcing area of the rear panel is secured by way of heat sealing and/or adhesion to the inner and/or outer layer.

3. The plastic carrier bag according to claim 1, wherein the first and second connecting areas of the at least one holding strap joined to the front panel and/or the first and second connecting areas of the at least one holding strap joined to the rear panel are on the inside of the front or rear panel in the region of the single or multi-layered plastic film strip of the reinforcing area.

4. The plastic carrier bag according to claim 1, wherein:
said plastic carrier bag comprises a first and a second holding strap joined to the front panel respectively in said first and second connecting areas, wherein the first holding strap has a greater extension between the associated first and second connecting areas than the second holding strap, and/or
said plastic carrier bag comprises a first and a second holding strap joined to the rear panel respectively in said first and second connecting areas, wherein the first holding strap has a greater extension between the associated first and second connecting areas than the second holding strap.

5. The plastic carrier bag according to claim 1, wherein:
the first flexible hollow body is formed from a first flexible plastic material strip with opposite first and second longitudinal side edges, the opposite first and second longitudinal side edges of which are heat sealed or adhered to one another in an overlapping area, and/or
the second flexible hollow body is formed from a second flexible plastic material strip with opposite first and second longitudinal side edges, the opposite first and second longitudinal side edges of which are heat sealed or adhered to one another in an overlapping area.

6. The plastic carrier bag according to claim 5, wherein in the first and/or second connecting areas of the first and/or second holding straps, that side of the holding strap is the joining side which does not have the overlapping areas of the opposite first and second longitudinal side edges of the first and second flexible plastic material strip of the first and second flexible hollow bodies.

7. The plastic carrier bag according to claim 1, wherein the outer layer, at least in sections, is based on a transparent plastic material that is printable or printed at least partly on the inside, and/or
wherein the at least one internal layer is printable or printed at least partly on the outside and the outer layer, at least in sections, is based on a transparent plastic material.

8. The plastic carrier bag according to claim 1, wherein the first flexible hollow body or the first flexible plastic material strip or the single or multi-layered material strip not forming a hollow body and/or the second flexible hollow body or the second flexible plastic material strip of the holding strap of the front and/or rear panel have an embossed pattern.

9. The plastic carrier bag according to claim 1, wherein an extension section adjoins the outer layer, wherein the extension section comprises or is the plastic film strip of the reinforcing area, wherein the extension section extends at least in sections along an inner side of the at least one internal layer, and bears on the at least one internal layer or can be placed thereon.

10. The plastic carrier bag according to claim 1, wherein an extension section adjoins the outer layer, wherein the extension section comprises or forms the plastic film strip of the reinforcing area, and wherein the extension section extends at least in sections along the outside of the at least one internal layer and bears on the at least one internal layer or can be placed thereon.

11. The plastic carrier bag according to claim 1, wherein the opening edge is formed by a fold at an upper end of the outer layer or in a transitional area from the outer layer to an extension section.

12. The plastic carrier bag according to claim 1, wherein:
an extension section adjoins the at least one internal layer, wherein the extension section comprises or is the plastic film strip of the reinforcing area, and wherein the extension section extends at least in sections along an inner side of the at least one internal layer and bears on the at least one internal layer or can be placed thereon, and
the extension section is heat sealed or adhered along an extension of, or spaced apart from, the first side edge in the direction of the second side edge or up to the second side edge to the inner side of the at least one internal layer.

13. The plastic carrier bag according to claim 1, wherein:
an extension section adjoins the at least one internal layer, wherein the extension section comprises or forms the plastic film strip of the reinforcing area, and wherein the extension section extends, at least in sections, along the outside of the at least one internal layer and bears on the at least one internal layer or can be placed thereon, and
the extension section is heat sealed or adhered along an extension of, or spaced apart from, the first side edge in the direction of the second side edge or up to the second side edge to the outside of the at least one internal layer.

14. The plastic carrier bag according to claim 12, wherein the opening edge is formed by a fold at an upper end of the at least one internal layer or in a transitional area from the at least one internal layer to the extension section.

15. The plastic carrier bag according to claim 1, wherein:
the single or multi-layered plastic film strip of the reinforcing area is a separate single or multi-layered plastic film strip which extends, at least in sections, along an inner side of the at least one internal layer and bears on the at least one internal layer or can be placed thereon, and
the separate plastic material strip is heat sealed or adhered along an extension of, or spaced apart from, the first side edge in the direction of the second side edge or up to the second side edge to an inner side of the at least one internal layer.

16. The plastic carrier bag according to claim 13, wherein:
the outer layer and the extension section of the front panel or the rear panel are in one piece, and/or
the at least one internal layer and the extension section of the front panel or the rear panel are in one piece, and/or
the outer layers of the front and rear panel are in one piece, and/or
the at least one internal layers of the front and rear panel are in one piece.

17. The plastic carrier bag according to claim 1, wherein:
the position of the single or multi-layered plastic film strip of the reinforcing area, which bears directly on an inner side of the at least one internal layer in the direction of the opening end, has a section which passes beyond an upper edge of the at least one internal layer, wherein the section passing beyond the upper edge is turned over said upper edge of the at least one internal layer and bears, at least in sections, on the outside of the at least one internal layer and/or an inner side of the outer layer, or
a turned over layer of a double-layered plastic film strip of the reinforcing area of the front panel forms a turned over end section which does not extend up to an upper edge of the at least one internal layer and/or the outer layer, and an end of the plastic film strip is provided in the fastening of the plastic film strip to the outer layer and/or the at least one internal layer, or the end section is present, at least in sections, with the fastening of the plastic film strip to the outer layer and/or the at least one internal layer and the end of the plastic film strip is adjacent to said fastening, and/or
a turned over layer of a double-layered plastic film strip of the reinforcing area of the rear panel is a turned over end section which does not extend up to an upper edge of the at least one internal layer and/or the outer layer, and an end of the plastic film strip is present in the fastening of the plastic film strip to the outer layer and/or the at least one internal layer, or the end section is present, at least in sections, in the fastening of the plastic film strip to the outer layer and/or the at least one internal layer and an end of the plastic film strip is adjacent to said fastening.

18. The plastic carrier bag according to claim 1, wherein the single or multi-layered plastic film strip of the reinforcing area is heat sealed or adhered over all of its layers to an inner side of the at least one internal layer along the extension of or spaced apart from the first side edge in the direction of or up to the second side edge by forming a first connecting strip.

19. The plastic carrier bag according to claim 1, wherein the outer layer of the front and/or rear panel is heat sealed or adhered to the outside of the at least one internal layer along the extension of or spaced apart from the first side edge in the direction of or up to the second side edge forming a second connecting strip.

20. The plastic carrier bag according to claim 1, wherein the single or multi-layered plastic film strip of the reinforcing area is heat sealed or adhered over all of its layers to an inner side of the at least one internal layer along the extension of or spaced apart from the first side edge in the direction of or up to the second side edge by forming a first connecting strip,
wherein the outer layer of the front and/or rear panel is heat sealed or adhered to the outside of the at least one internal layer along the extension of or spaced apart from the first side edge in the direction of or up to the second side edge forming a second connecting strip, and
wherein the first connecting strip and the second connecting strip overlap, at least in some sections.

21. The plastic carrier bag according to claim 1, wherein the first and second connecting areas of the holding straps joined to the front panel and/or the rear panel are spaced apart from the connection of the single or multi-layered plastic film strip of the reinforcing area of the front panel to the at least one internal layer and/or the outer layer or spaced apart from the connection of the single or multi-layered plastic film strip of the reinforcing area of the rear panel to the at least one internal layer and/or the outer layer.

22. The plastic carrier bag according to claim 1, wherein the outer layer, the single or multi-layered plastic film strip of the reinforcing area, and the at least one internal layer of the front and/or rear panel are made of polyolefins.

23. The plastic carrier bag according to claim 22, wherein the polyolefins comprise LD-polyethylene.

24. The plastic carrier bag according to claim 1, wherein:
the at least one internal layer of the front panel and/or the rear panel comprises a foamed plastic film, and/or the first flexible hollow body or the single or multi-layered material strip not forming a hollow body comprises a foamed plastic film, and the outer layer of the front and/or rear panel is a non-foamed plastic film, and/or the second flexible hollow body is based on or formed from a non-foamed plastic film.

25. The plastic carrier bag according to claim 1, wherein the at least one internal layer of the front and/or rear panel is a foamed polyethylene film, and wherein the outer layer of the front and/or rear panel and the single or multi-layered plastic film strip of the reinforcing area is a non-foamed polyethylene film.

26. The plastic carrier bag according to claim 1, wherein the outer layer, the single or multi-layered plastic film strip of the reinforcing area, and/or the at least one internal layer of the front and/or rear panel are in the form of a film.

27. The plastic carrier bag according to claim 1, wherein the outer layer, the single or multi-layered plastic film strip of the reinforcing area, and/or the at least one internal layer of the front and/or rear panel contain recycled plastic material or are made of recycled plastic material.

28. The plastic carrier bag according to claim 1, wherein the multi-layered front panel and/or the multi-layered rear panel is double-layered.

29. The plastic carrier bag according to claim 1, wherein the at least one internal layer is an inner layer.

30. The plastic carrier bag according to claim 1, wherein the reinforcing area in the area of the opening end of the front and/or rear panel extends up to the opening end or comprises the opening end.

31. The plastic carrier bag according to claim 1, wherein the reinforcing area contains a double-layered plastic film strip.

32. The plastic carrier bag according to claim 1, wherein the single or multi-layered plastic film strip of the reinforcing area of the rear panel and/or of the front panel is secured by way of thermoplastic sealing to the at least one internal layer and/or the outer layer, or spaced apart from the first side edge in the direction of the second side edge or up to the second side edge.

33. The plastic carrier bag according to claim 9, wherein the extension section on the inner side of the at least one internal layer is at least double-layered by turning over.

34. The plastic carrier bag according to claim 10, wherein the extension section on the outside of the at least one internal layer is at least double-layered by turning over.

35. The plastic carrier bag according to claim 1, wherein the outer layer, the single or multi-layered plastic film strip of the reinforcing area, and the at least one internal layer of the front and/or rear panel and the holding straps joined to the front panel and/or to the rear panel are made of polyethylene.

36. The plastic carrier bag according to claim 1, wherein the outer layer, the single or multi-layered plastic film strip of the reinforcing area or the extension section of the inner or outer layer, and the at least one internal layer of the front and rear panel and the holding straps joined to the front panel and rear panel are formed of LD-polyethylene, wherein the at least one internal layer of the front and rear panel is a foamed LD-polyethylene film, and wherein the outer layer of the front and/or rear panel and the single or multi-layered plastic film strip of the reinforcing area is a non-foamed LD-polyethylene film.

37. The plastic carrier bag according to claim 1, wherein:
in the first and second connecting areas of the holding straps, inner sides of the first flexible hollow body lying against one another are not joined to one another, and
an outer side of the first flexible hollow body which faces towards the inside of the bag and an inner side of the second flexible hollow body adjacent thereto are not joined to one another.

* * * * *